(12) United States Patent
Shubin, Sr. et al.

(10) Patent No.: US 12,136,355 B2
(45) Date of Patent: Nov. 5, 2024

(54) METHOD AND SYSTEM OF CREATING A REPLICA OF AN ANATOMICAL STRUCTURE

(71) Applicant: Steven A. Shubin, Sr., Austin, TX (US)

(72) Inventors: Steven A. Shubin, Sr., Austin, TX (US); David H. Ashley, Austin, TX (US); Steven A. Shubin, Jr., Santa Fe, NM (US); Philip V. D'Andrea, Santa Fe, NM (US); Anthony A. Barlow, Santa Fe, NM (US)

(73) Assignee: Steven A. Shubin, Sr., Dripping Springs, TX (US)

( * ) Notice: Subject to any disclaimer, the term of this patent is extended or adjusted under 35 U.S.C. 154(b) by 546 days.

(21) Appl. No.: 17/491,773

(22) Filed: Oct. 1, 2021

(65) Prior Publication Data
US 2022/0020292 A1    Jan. 20, 2022

Related U.S. Application Data

(63) Continuation-in-part of application No. 16/287,241, filed on Feb. 27, 2019, now Pat. No. 11,234,893.

(51) Int. Cl.
*G09B 23/30* (2006.01)
*B29C 33/38* (2006.01)
(Continued)

(52) U.S. Cl.
CPC .......... *G09B 23/30* (2013.01); *B29C 33/3835* (2013.01); *B29C 33/3842* (2013.01);
(Continued)

(58) Field of Classification Search
None
See application file for complete search history.

(56) References Cited

U.S. PATENT DOCUMENTS 5,466,235 A   11/1995 Shubin, Sr.
5,782,818 A    7/1998 Shubin
(Continued)

FOREIGN PATENT DOCUMENTS

CN   105637512 A   6/2016
CN   106510893 A   3/2017
(Continued)

OTHER PUBLICATIONS

Wang, Liding, "Polymer Micro-Nanofabrication Technology", National Defense Industry Press (2012), pp. 94-95, ISBN: 978-7-118-08359-0 (and partial Google translation to English).
(Continued)

*Primary Examiner* — Sean Shechtman
(74) *Attorney, Agent, or Firm* — Dickinson Wright PLLC

(57) ABSTRACT

Creating a replica of an anatomical structure. In one embodiments a method includes: accepting pictures of the anatomical structure of a subject; creating an object file that contains an initial model of an outside surface of the anatomical structure; cutting the initial model to a predetermined exterior shape circumscribing the anatomical structure to create a positive model; creating a negative model from the positive model; placing a stem tool object on an outside surface of the negative model in relationship to an orifice, thereby creating a final negative model; placing a zeroing and angling object to align the negative model to a predetermined angle; placing a base tool object by coupling the base tool object to the outside surface; printing, by way of a three-dimensional printer, the final negative model to create a negative mold; and casting the replica of the anatomical structure using the negative mold.

20 Claims, 29 Drawing Sheets

(51) Int. Cl.
  *B33Y 30/00* (2015.01)
  *B33Y 50/00* (2015.01)
  *B33Y 80/00* (2015.01)
(52) U.S. Cl.
  CPC ............... *B33Y 30/00* (2014.12); *B33Y 50/00* (2014.12); *B33Y 80/00* (2014.12)

(56) References Cited

U.S. PATENT DOCUMENTS

| | | | |
|---|---|---|---|
| 5,806,523 | A | 9/1998 | Shubin, Sr. |
| 5,807,360 | A | 9/1998 | Shubin |
| 8,538,570 | B2 | 9/2013 | Stanhope et al. |
| D703,678 | S | 4/2014 | Shubin, Sr. |
| D704,201 | S | 5/2014 | Shubin, Sr. |
| D706,274 | S | 6/2014 | Shubin, Sr. |
| D724,204 | S | 3/2015 | Shubin, Sr. et al. |
| D726,308 | S | 4/2015 | Shubin, Sr. et al. |
| 9,039,600 | B2 | 5/2015 | Shubin, Sr. et al. |
| D732,662 | S | 6/2015 | Shubin, Sr. et al. |
| 9,201,988 | B2 | 12/2015 | Stanhope et al. |
| 9,202,388 | B2 | 12/2015 | Vesto |
| 9,254,121 | B2 | 2/2016 | Shubin, Sr. et al. |
| D751,694 | S | 3/2016 | Shubin, Sr. et al. |
| 9,420,260 | B2 | 8/2016 | McGregor |
| 9,460,557 | B1 | 10/2016 | Tran et al. |
| 9,597,060 | B2 | 3/2017 | Shubin, Sr. et al. |
| 9,610,731 | B2 | 4/2017 | Zachariasen |
| 9,738,036 | B2 | 8/2017 | Littlefield |
| 9,949,866 | B2 | 4/2018 | Shubin, Sr. |
| 9,959,453 | B2 | 5/2018 | Eikelis et al. |
| 9,987,801 | B2 | 6/2018 | Littlefield |
| 10,070,672 | B2 | 9/2018 | Simoes |
| 10,147,229 | B2 | 12/2018 | McGregor et al. |
| 10,166,716 | B2 | 1/2019 | Littlefield |
| 10,284,731 | B2 | 5/2019 | Newell et al. |
| 2012/0088023 | A1 | 4/2012 | Begun |
| 2012/0232857 | A1 | 9/2012 | Fisker et al. |
| 2014/0088750 | A1 | 3/2014 | Sharma et al. |
| 2015/0025666 | A1 | 1/2015 | Olivieri et al. |
| 2015/0170416 | A1 | 6/2015 | McGregor et al. |
| 2016/0151976 | A1 | 6/2016 | Littlefield |
| 2016/0217518 | A1 | 7/2016 | Shapiro |
| 2016/0371835 | A1 | 12/2016 | Grbic et al. |
| 2017/0036402 | A1 | 2/2017 | Zachariasen et al. |
| 2017/0053434 | A1 | 2/2017 | McGregor et al. |
| 2017/0057169 | A1 | 3/2017 | Grbic et al. |
| 2017/0057175 | A1 | 3/2017 | Blackmon et al. |
| 2017/0142276 | A1 | 5/2017 | Lacagnina et al. |
| 2017/0202695 | A1 | 7/2017 | Zachariasen |
| 2017/0312184 | A1 | 11/2017 | Lofaro et al. |
| 2017/0312185 | A1 | 11/2017 | Lofaro et al. |
| 2017/0312186 | A1 | 11/2017 | Lofaro et al. |
| 2017/0360578 | A1 | 12/2017 | Shin et al. |
| 2018/0015379 | A1 | 1/2018 | Pratt |
| 2018/0022018 | A1 | 1/2018 | Cambridge |
| 2018/0059631 | A1 | 3/2018 | Newell et al. |
| 2018/0071502 | A1 | 3/2018 | Hakim et al. |
| 2018/0074759 | A1 | 3/2018 | Boccanfuso et al. |
| 2018/0116762 | A1 | 5/2018 | Kopelman |
| 2018/0350266 | A1 | 12/2018 | Garcia |
| 2019/0012425 | A1 | 1/2019 | Netravali et al. |
| 2019/0021865 | A1 | 1/2019 | Vogtmeier |
| 2020/0268596 | A1 | 8/2020 | Shubin, Sr. et al. |

FOREIGN PATENT DOCUMENTS

| | | |
|---|---|---|
| CN | 107139484 A | 9/2017 |
| JP | 2005139593 A | 6/2005 |
| JP | 2013507703 A | 3/2013 |
| RU | 2544479 C2 | 3/2015 |
| WO | 2017140611 A1 | 8/2017 |
| WO | 2018017939 A1 | 1/2018 |
| WO | 2018049524 A1 | 3/2018 |
| WO | 2018069736 A1 | 4/2018 |
| WO | 2017077146 A1 | 5/2018 |
| WO | 2018089413 A1 | 5/2018 |
| WO | 2018222779 A1 | 12/2018 |
| WO | 2019004981 A3 | 1/2019 |
| WO | 2019051579 A1 | 3/2019 |

OTHER PUBLICATIONS

Second Office Action of Chinese Patent Application No. 202010116254.5, mailed Mar. 1, 2022 (and partial Goolge to English).
Office Action of European Patent Application No. 20158891.0, mailed Aug. 5, 2022.
International Search Report and Written Opinion for International Application No. PCT/US2021/053125, International Filing date Oct. 1, 2021, Date of Mailing Dec. 28, 2021, 16 pages.
Grunewald, Scott, "Ladies, You Can Now 3D Print a Sex Toy Based on Your Lady Parts Thanks to SexShop3D—NSFW," https://3dprint.com/118292/3d-print-sex-toy-lady-parts/; Additive Manufacturing; 11 pages; Feb. 6, 2016; Copyright 2019, 3DR Holdings, LLC.
European Patent Office, European Search Report in application 20158891.0-1230, Mailed Jul. 27, 2020; 13 pages.
Mingliang Xu, Et al., "Interactive Mechanism Modeling from Multi-View Images", ACM Transaction on Graphics, ACM, NY, US, vol. 35, No. 6; Nov. 11, 2016; 13 pages.
Anonymous, "Autodesk 123D", Wikipedia, <https://en.wikipedia.org/wiki/Autodesk_123D>, Nov. 10, 2015, retrieved from the Internet on Aug. 10, 2020; 3 pages.
Ault, Holly K., "3-D Geometric Modeling for the 21st Century", Worcester Polytechnic Institute, Jan. 1, 1999, Engineering Design Grpahics Journal Spring 1999, vol. 63, No. 2; <https://pdfs.semanticscholar.org/3be2/de0f112dafb5615017c3865fdbef6265d325.pdf>; retrieved from Internet on Aug. 10, 2020; 10 pages.
Federeal Service for Intellectual Property, First office action and Search Report for Russia Patent App. 2020107878, mailed Oct. 19, 2020; 8 pages.
IP Australia, Australian Government, Examination Report No. 1 for AU Patent Application No. 2020200627, Dated Nov. 30, 2020; 5 pages.
Japanese Patent Office, Office Action and Notice of Reasons for Rejection for Patent Application No. 2020-030086, Mailed Jan. 26, 2021; 4 pages.
Canadian Intellectual Property Office, Patent Office Communication for Canadian Application No. 3,071,910; dated Apr. 6, 2021; 8 pages.
Chinese Office Action mailed Aug. 2, 2022 for CN Application No. 202010116254.5, 24 pages.
First Chinese Office Action mailed Sep. 3, 2021 for CN Application No. 202010116254.5, 19 pages.
Second Examination Report mailed Jan. 29, 2021 for Australian Patent Application No. 2020200627, 7 pages.
Dequn, Li, "China Die & Mould Design Canon, Design of Moulds for Light Industry," Jiangxi Science and Technology Press, vol. 2, Jan. 31, 2003, 5 pages.
Yong, He, "3D Bio-printing From Medical Aids Manufacturing to Cell Printing," Huazhong University of Science and Technology Press, Jan. 31, 2019, 6 pages.
Zhang, Juxiang, "3D Printing Technology and its Application," National Defense Industry Press, Mar. 31, 2016, 5 pages.

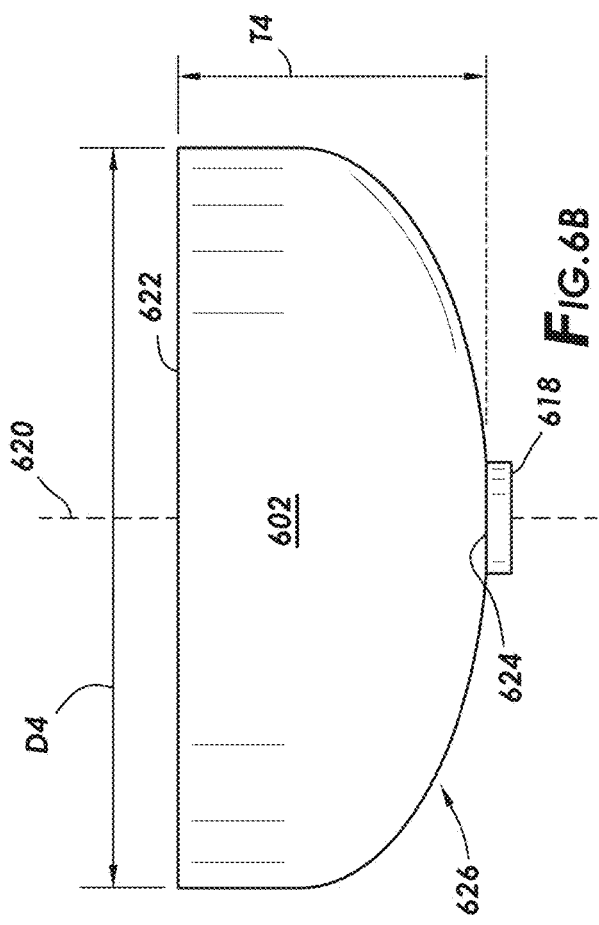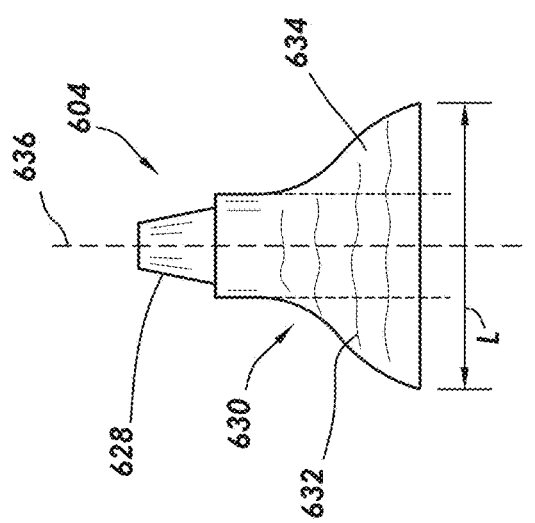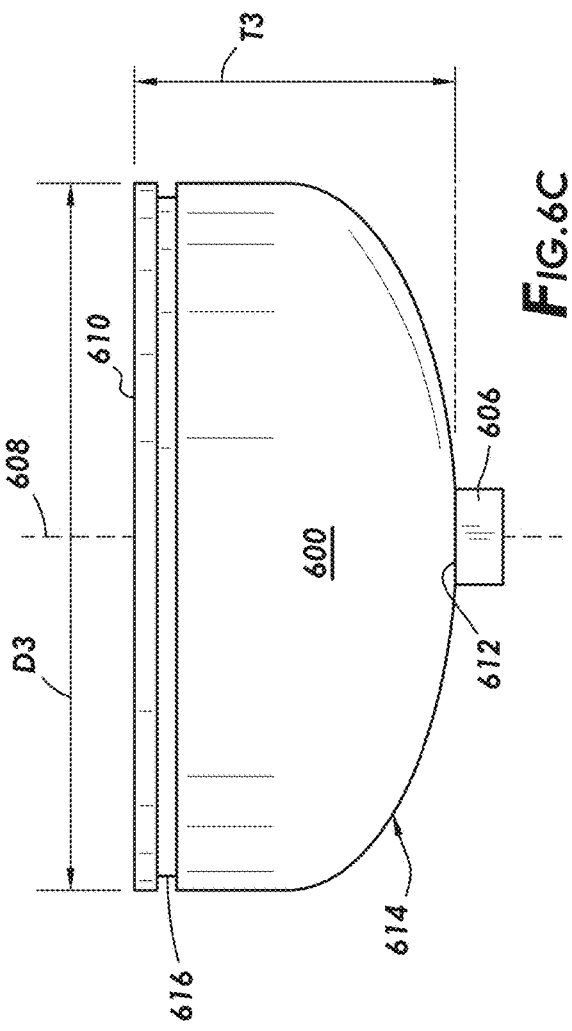

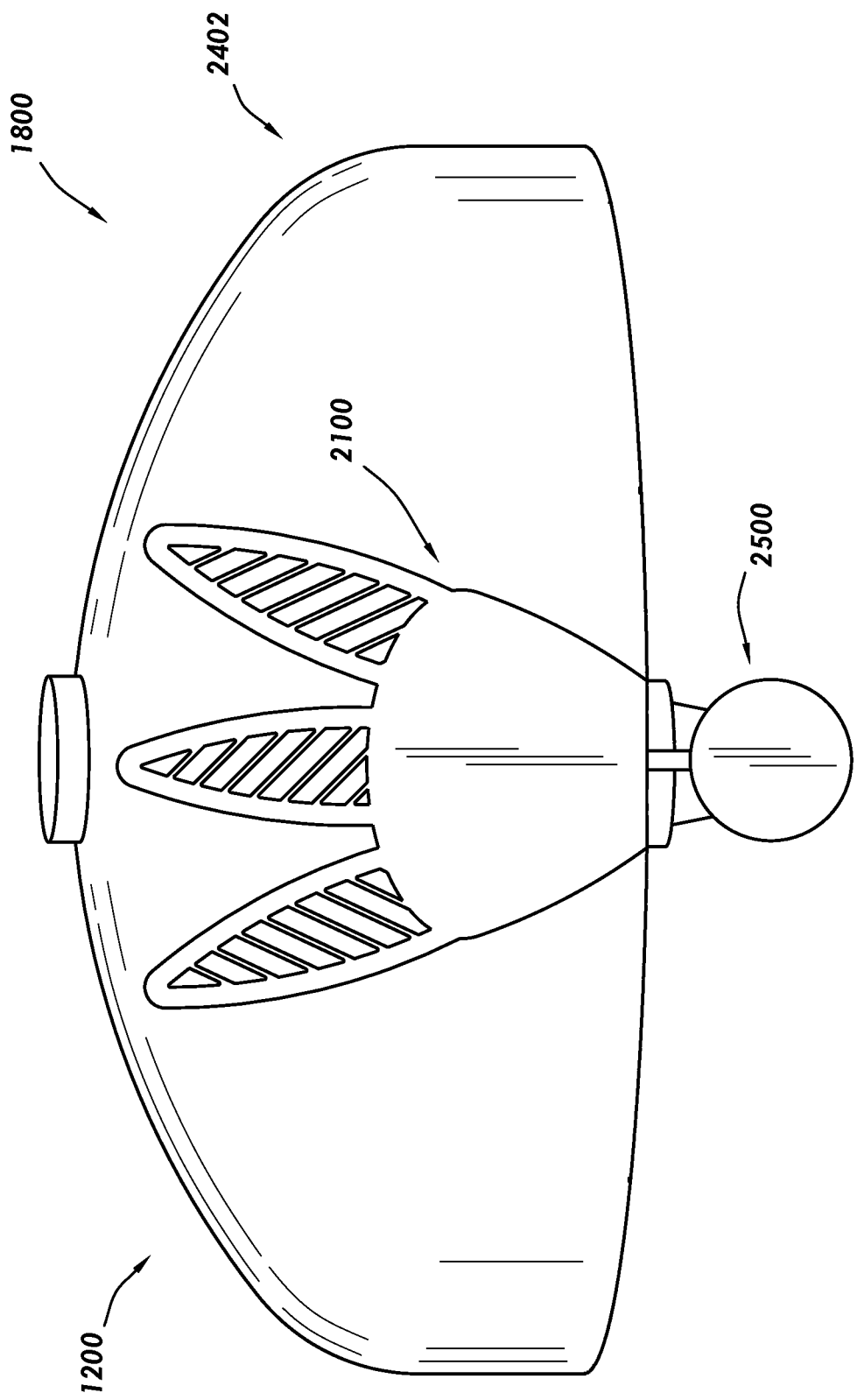

METHOD AND SYSTEM OF CREATING A REPLICA OF AN ANATOMICAL STRUCTURE

CROSS-REFERENCE TO RELATED APPLICATIONS

This application is a continuation-in-part of and claims priority to U.S. application Ser. No. 16/287,241, filed Feb. 27, 2019, titled "Method and System of Creating a Replica of an Anatomical Structure," which is hereby incorporated by reference in its entirety for all purposes.

BACKGROUND

Creating replicas of anatomical structures in the related art is a time consuming process. Before advancements in computer technology, creating the replicas involved making a plaster cast of the subject to be replicated to create a negative image, and then using the negative image to cast a positive image, such as in an elastomer gel that simulates human skin. The techniques were used not just for faces, but any anatomical structure, like feet, hands, and legs.

As computer technology has advanced, the ability to create digital images of existing structures, like faces, has improved significantly. Moreover, advances in three-dimensional printing technology theoretically enable printing of positive images of a subject or portion of a subject to be replicated without the need to mix vats of plaster. However, while the advances have eliminated the use of plaster and arguably sped the process, the various technologies are not well integrated. Creating a replica of an anatomical structure in the related art is still a time consuming process that cannot support mass production of replicas of anatomical structures, where each anatomical structure is unique.

Thus, any improvement or advancement which shortens cycle time in the creation of replicas of anatomical structures would provide a competitive advantage in the marketplace.

BRIEF DESCRIPTION OF THE DRAWINGS

For a detailed description of example embodiments, reference will now be made to the accompanying drawings in which:

FIGS. 6A, 6B, and 6C show side elevation views of three objects in accordance with at least some embodiments;

FIG. 25 shows a top view of the base tool object including a tab for the bracing tool object in accordance with at least some embodiments;

NOTATION AND NOMENCLATURE

Various terms are used to refer to particular system components. Different companies may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Example embodiments are directed to creating replicas of anatomical structures. More particularly, example embodiments are directed to creating replicas of anatomical structures, where those replicas are cast in negative molds printed on three-dimensional (3D) printers. More particularly still, example embodiments are directed to methods and related systems of creating replicas of anatomical structures on demand from a series of pictures (such as a video) of the anatomical structure. The various embodiments were developed in the context of creating replicas of anatomical structures for male masturbation devices (e.g., replicas of external female genitalia), and thus the description that follows is based on the developmental context. However, the developmental context shall not be read as a limitation of the scope of the technology. With the benefit of this disclosure, one of ordinary skill in the art could expand the reach to including creating replicas of any anatomical structure, such as facial features for use in movies, replica breasts for use by cancer patients who have had mastectomies, and the like. The specification first turns to a description of an example system to orient the reader.

Figure 1:
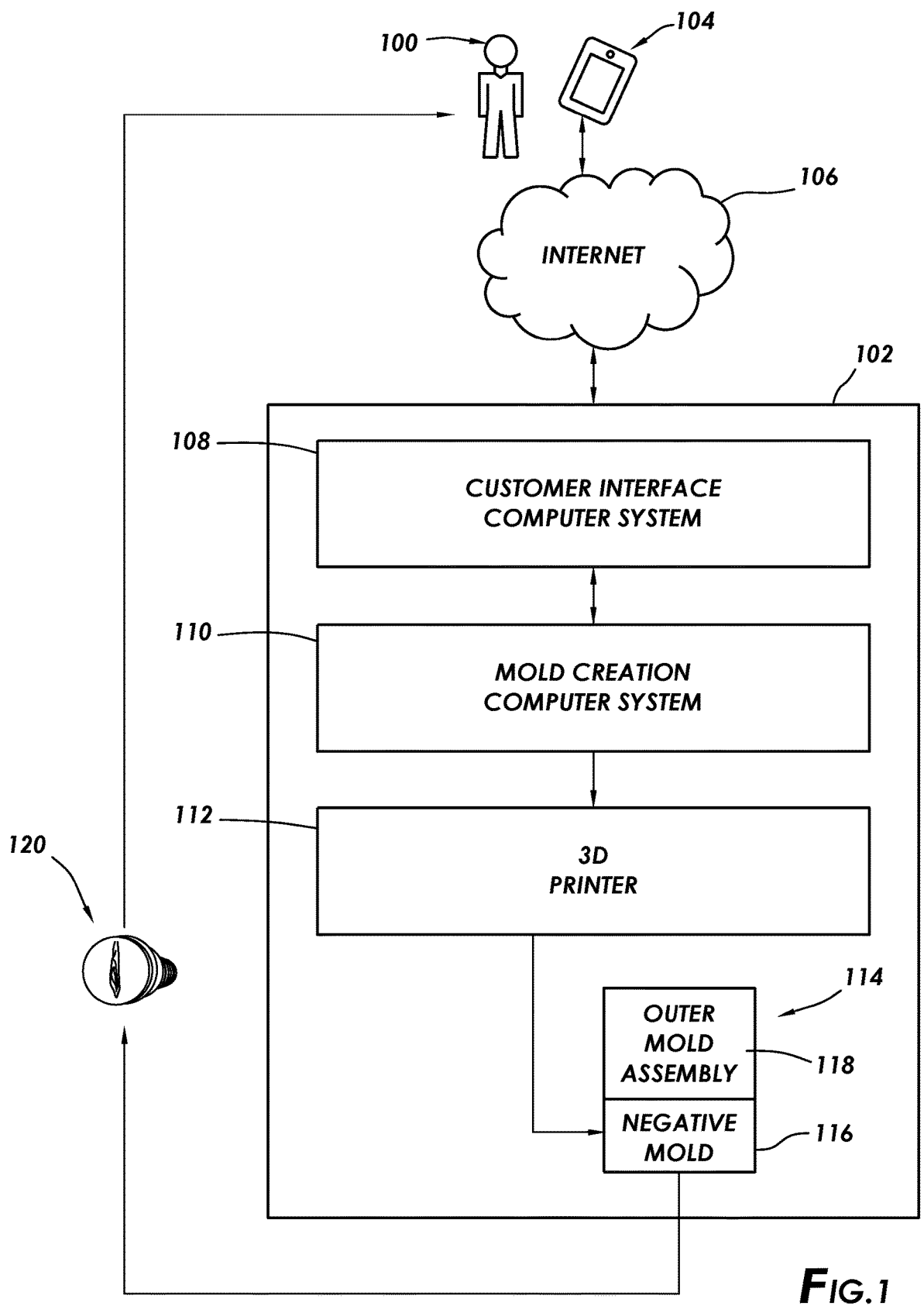
FIG. 1 shows a system in accordance with at least some embodiments.

FIG. 1 shows a system in accordance with at least some embodiments. In particular, the example system comprises person or subject 100, where the subject desires to create a replica of an anatomical structure of the subject 100, such as the subject's mouth, external genitalia (e.g., external female genitalia), or anus. In order to create the replica, the subject 100 interacts with a replica system 102 by way of a computing device 104, such as a desktop computer, a laptop computer, or a mobile computing device, or a mobile phone. In the example system, the subject 100 communicates by way of the Internet 106, though there may be any number of local area networks, wide area networks, and/or private networks between the computing device 104 and the replica system 102.

The replica system 102 is conceptually divided into a customer interface computer system 108, a mold creation computer system 110, a 3D printer 112, and a cast system 114. The example cast system 114 includes a negative mold 116 that, as discussed more below, is created on demand, and an outer mold assembly 118 that includes features that are included with each replica (e.g., features that hold the replica within an outer cover). In some cases the result of the casting process of the cast system 114 is an elastomeric insert that has a replica of the anatomical structure on a distal end thereof. The elastomeric inserting may be placed within an outer cover, such as a casing of hard plastic, to create the final product illustratively shown as male masturbation device 120. The example male masturbation device 120 is shown in an outer cover similar to a FLESHLIGHT® brand product available from Interactive Life Forms, LLC of Austin, Texas, but the outer cover may take any suitable form, or be omitted, depending on the situation.

Still referring to FIG. 1, as the name implies, the customer interface computer system 108 is the computer system with which a customer, such as subject 100, interacts when interacting with the with the replica system 102. The customer interface computer system 108 may be a desktop computer system, a laptop computer system, a group of computer systems operating in tandem, a rack-mounted computer system (e.g., a server), a plurality of servers co-located or at disparate locations, a cloud-based computer system whose physical location may change from time-to-time depending on loading, or combinations of any of these computer systems. Because of the anatomical structures to be replicated may include external genitalia and/or the anus, federal law may require certain explicit procedures and record keeping. For example, 18 U.S.C. § 2557 prescribes certain conduct that must be followed, such as verifying the name, date of birth, maiden name, aliases, and nicknames, among others, of the subject. Other regulations, such as 28 C.F.R. § 75.2(e) prescribes that information collected under Section 2557 be stored segregated from other data. These are merely examples to show that the customer interface computer system 108 serves a specific (and in some cases federally mandated) set of functions, which is one of the reasons the customer interface computer system 108 is shown as a distinct computer system from the mold creation computer system 110.

More particularly then, the example customer interface computer system 108 enables the subject 100 to create an account within the replica system 102, such as by interacting with the replica system 102 by way of computing device 104. Once an account has been created, and before the replica system accepts representations of an anatomical structure to be replicated, the subject 100 is required to provide proof of age and identity. In one example embodiment the subject 100 is prompted to submit several pictures such as: a picture of the front of the driver's license of the subject 100; a picture of the back of the driver's license of the subject 100; a headshot of the subject 100 with the front of the driver's license held next to the head of the subject; and/or a headshot of the subject 100. The information provided by the subject 100 during creation of the account can then be verified against the driver's license. In one example embodiment, the pictures of the front (and possibly back) of the driver's license are subjected to character recognition software that extracts information such as name, address, and date of birth to create verification data. The customer interface computer system 108 may then automatically compare the verification data to data supplied by the subject 100 during creation of the account. If the information does not match, then the login may be flagged, or passed to a human reviewer to make the analysis.

Similarly, the customer interface computer system 108 may also verify that the subject 100 is indeed the person depicted in the driver's license picture. For example, the picture containing the head shot of the subject 100, along with the picture of the front of the driver's license of the subject 100, may each be provided to a facial recognition program. While the size of the face in the head shot compared to the face of the driver's license picture may be different, the relative location, spacing, and size of the facial features should be the same as between the two pictures if the pictures are of the same subject. More specifically, the example customer interface computer system 108 may compare the facial features as between the picture containing the head shot of the subject 100, and the picture on the driver's license of the subject 100, and determine whether the two faces are the same face. Alternatively, the single picture containing the head shot of the subject 100 next to the driver's license of the subject 100 may be supplied to the facial recognition program, and the same determination made. In yet still other cases, the facial recognition program may be provided the picture of head shot of the subject 100, the picture of the head shot next to the driver's license, and the picture of the driver's license, and the facial recognition program may make a determination whether all the faces are from the same subject based on picking out facial features within each picture (including facial features of multiple faces within a single picture). If the facial recognition program ascertains that the faces are same, then the subject 100 is considered age verified. If the facial recognition program cannot verify that the faces are the same, or the confidence index regarding the facial recognition is low, then the pictures may be provided to a human reviewer to make the determination.

Either at the time the login is created, or after the subject 100 has been age verified, the customer interface computer system 108 assigns the subject 100 a unique identification number or unique identifier. The unique identifier may be used by other portions of the replica system 102, such as the mold creation computer system 110, as a means to identify the particular mold created without including personally identifiable information of the subject 100.

Still referring to FIG. 1, once the subject 100 has been age verified, the customer interface system computer system 108 may send a notification to the subject 100 that they have been approved for upload. That message may take any suitable form, such as a text message, an electronic mail message, or automated or manual phone call. Regardless of the form of the notification, the customer interface computer system 108 is enabled to accept representations of the anatomical structure which the subject 100 wishes to replicate. Any attempt by the subject 100 to upload representations of anatomical structures prior to age verification will be rejected. To upload, in example systems the subject 100 interacts with the customer interface computer system 108 using the computing device 104 to upload representations of the anatomical structure to be replicated. The discussion proceeds on an assumption that the subject 100 does not have access to software tools to create an intermediate mold (e.g., positive mold) or negative mold of the anatomical structure, and thus the representations of the anatomical structure uploaded will be in the form of a video or series of still pictures. Alternative situations are discussed more below.

In particular, the subject 100 may take a video of the anatomical structure, or may take a series of still pictures. While possible to take the video or series of still pictures without preparing the anatomical structure, better results may be achieved if certain preparatory steps are taken beforehand. For example, regardless of the anatomical structure, removing all hair (e.g., shaving) provides a more consistent surface for later programmatic steps in the process. To the extent the subject 100 wants the final product to include representations of hair (e.g., pubic hair, mustache, and goatee), a texture that simulates hair can be added later in the process (discussed more below). In an example of the anatomical structure being external female genitalia, such a replica is likely to be a gift for a mate. Prior to capturing the video or taking the pictures, physical arousal of the subject 100 to induce swelling and flushing is recommended. Relatedly, physically separating the labia to better expose the vaginal entrance is recommended. Next, visual contrast of the various anatomical structures (e.g., labia, clitoral hood) may be obtained by increasing the contrast of the skin, such as by use of baby oil, or in some cases baby powder. In the case of the replica being the mouth, application of lipstick may provide increased contrast (though the lipstick color may not be reproduced in the replica). Beyond preparatory steps regarding the anatomical structure, the camera used (e.g., camera on the computing device 104) may be set for highest resolution, and a suitable frame rate (e.g., 60 frames per second). The anatomical structure should be well lit, either by the computing device 104 or by external lighting.

The plurality of pictures of the anatomical structure should be from a distinct plurality of viewing angles relative to the anatomical structure. For example, in the case of external female genitalia, a video may be taken with legs spread wide, and starting with the computing device 104 abutting a first leg. In some embodiments, the motion of the imaging device used to obtain the video may be drone-like in that it moves in a zig-zag like fashion from one leg to the other while imaging the external female genitalia. Such a technique may enable easier and more thorough coverage of a target. For example, the images obtained performing a drone-like flyover may cover the target from numerous different angles that enable a more robust and accurate depiction of the target when the images are stitched together and duplicated images are removed. The video is started and then the computing device is moved smoothly to the second leg, keeping the labia and vaginal entrance within the frames during the movement. In the case of the mouth, a video may be taken starting from a first side of the face with smooth movement of the computing device 104 to a second side of the face, keeping the mouth with the frames during the movement. As for the anus as the anatomical structure, the video may be taken with movement laterally across the buttocks in a fashion similar to the labia. In other cases, rather than video, the subject 100 or an assistant may take a series of still pictures, where the location of the camera for each picture resides in an arc partially around the anatomical structure (e.g., the anatomical structure resides at the focal point of the arc).

Regardless of the form of the representations of the anatomical structure, in example systems the subject 100 uploads the representations to the replica system 102. More particularly, the representations of the anatomical structure (e.g., video, series of still pictures) are received by the customer interface computer system 108. In the case of video taken by a computing device 104 being a smart phone with an Android® or WINDOWS® operating system, the video may have an MP4 format. In the case of video taken by a computer device 104 being iPhone® brand device with an IOS operating system, the video may be in a QUICKTIME® or .MOV format. Other video formats, including after-developed video formats, are possible. If the representations are a series of still pictures, the format may be any suitable picture format, such as a JPEG .jpg, .png, or Adobe® .pdf format. Other pictures formats, including after-developed formats, are possible. Personally identifiable information is removed (e.g., removed from file names, removed from metadata), and the representations are identified (e.g., file names) with the unique identifier previously assigned to the subject. The customer interface computer system 108 then passes the representations of the anatomical structure identified by the unique identifier, to the mold creation computer system 110. In some embodiments, the customer interface computer system 108 then discards the representation of the anatomical structure so as keep the personally identifiable information segregated. Stated differently, in example systems the customer interface system 108 is a separate and distinct computer system (or set of computer systems) from the mold creation computer system 110 (or set of computer systems) such that in the event of a data security breach to one system the hacker cannot obtain both personally identifiable information of the subject 100 and pictures or other representations of the subject's anatomical structure(s).

Figure 2:
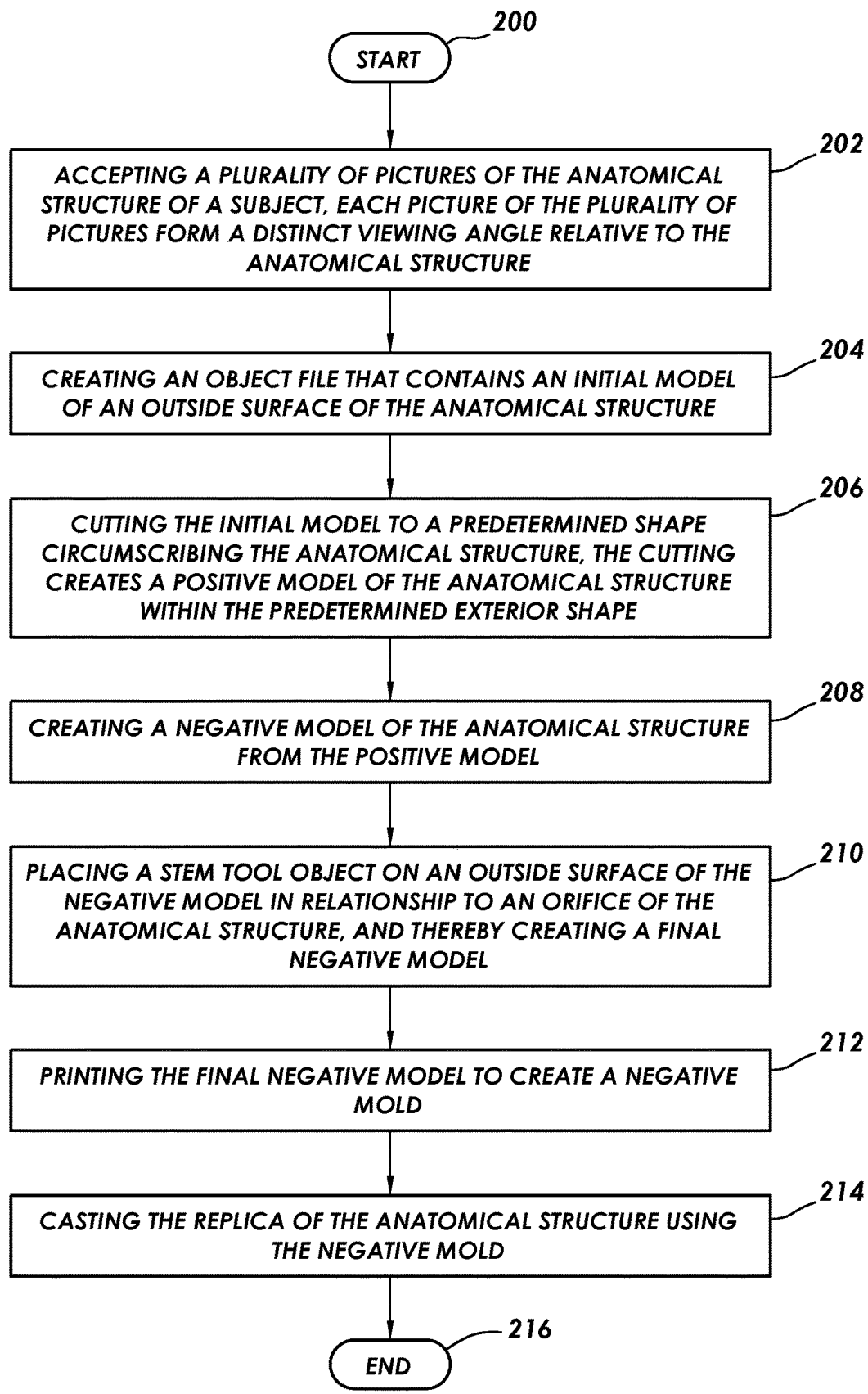
FIG. 2 shows a method in accordance with at least some embodiments.

The discussion now turns to a series of steps performed by a combination of the mold creation computer system 110, the 3D printer 112, and the cast system 114. FIG. 2 shows a method in accordance with at least some embodiments. In particular, FIG. 2 is presented as a high level overview of an example process to create a replica of an anatomical structure in accordance with example embodiments. FIG. 2 serves as an organizational guide to the balance of the discussion. The example method starts (block 200) and comprises: accepting, by a first computer system, a plurality of pictures of the anatomical structure of a subject, each picture of the plurality of pictures from a distinct viewing angle relative to the anatomical structure (block 202); creating, by the first computer system, an object file that contains an initial model of an outside surface of the anatomical structure (block 204); cutting, by the first computer system, the initial model to a predetermined exterior shape circumscribing the anatomical structure, the cutting creates a positive model of the anatomical structure within the predetermined exterior shape (block 206); creating, by the first computer system, a negative model of the anatomical structure from the positive model (block 208); placing, by the first computer system, a stem tool object on an outside surface of the negative model in an abutting relationship to an orifice of the anatomical structure, and thereby creating a final negative model (block 210); printing, by way of a three-dimensional printer, the final negative model to create a negative mold (block 212); and casting the replica of the anatomical structure using the negative mold (block 214). Thereafter the method ends (block 216), though the process likely begins anew with a new set of pictures of an anatomical structure of another subject. Each step will be addressed in turn, and in greater detail.

The first step in the example method is accepting a plurality of pictures of the anatomical structure of the subject 100, each picture of the plurality of pictures from a distinct viewing angle relative to the anatomical structure (block 200). In the example system, the accepting of the plurality of pictures is by the mold creation computer system 110 (FIG. 1) from the customer interface computer system 108 (also FIG. 1). However, in other cases the mold creation computer system 110 may receive the plurality of pictures directly or through any suitable intermediate computer system. In some example cases, the mold creation computer system 110 receives or accepts the plurality of pictures in the form of a video comprising a plurality of frames. In such situations, the mold creation computer system 110 may extract the plurality of pictures from the video, with each picture of the plurality of pictures corresponding to a frame of the video. In cases where a video is received, the mold creation computer system 110 may extract the pictures by discarding frames from the first few seconds of video (e.g., first three second), discarding frames from the last few seconds of video (e.g., last three seconds), and then selecting frames from what remains (e.g., selecting 40 to 50 frames from the remaining frames). In the case of receiving or accepting the plurality of pictures directly, the extracting may be omitted.

Next, the example method creates an object file that contains an initial model of an outside surface of the anatomical structure (block 204). That is, the initial model is a digital representation of the outside surface of the anatomical structure in any suitable file format. For example, the initial model may be series of points in a three-dimensional space, where each point defines the vertex of a triangle, and where all the triangles viewed together give the visual appearance of a three-dimensional object. Example file formats for the initial model include files in an ".OBJ" geometry definition, files in a stereolithography ".STL" definitions, as well as any currently available or after-developed file format that represents three-dimensional surfaces.

In accordance with at least some embodiments, extracting the plurality of pictures, and creating the object file, may be accomplished by supplying the plurality of pictures to a photogrammetry program, such as 3DF Zephyr produced by 3Dflow of Verona, Italy. Other photogrammetry programs, including after-developed photogrammetry programs, may be equivalently used. The example 3DF Zephyr accepts video and/or still pictures in a variety of file formats, and produces a point cloud model of the scene in the pictures in an .OBJ format.

Figure 3:
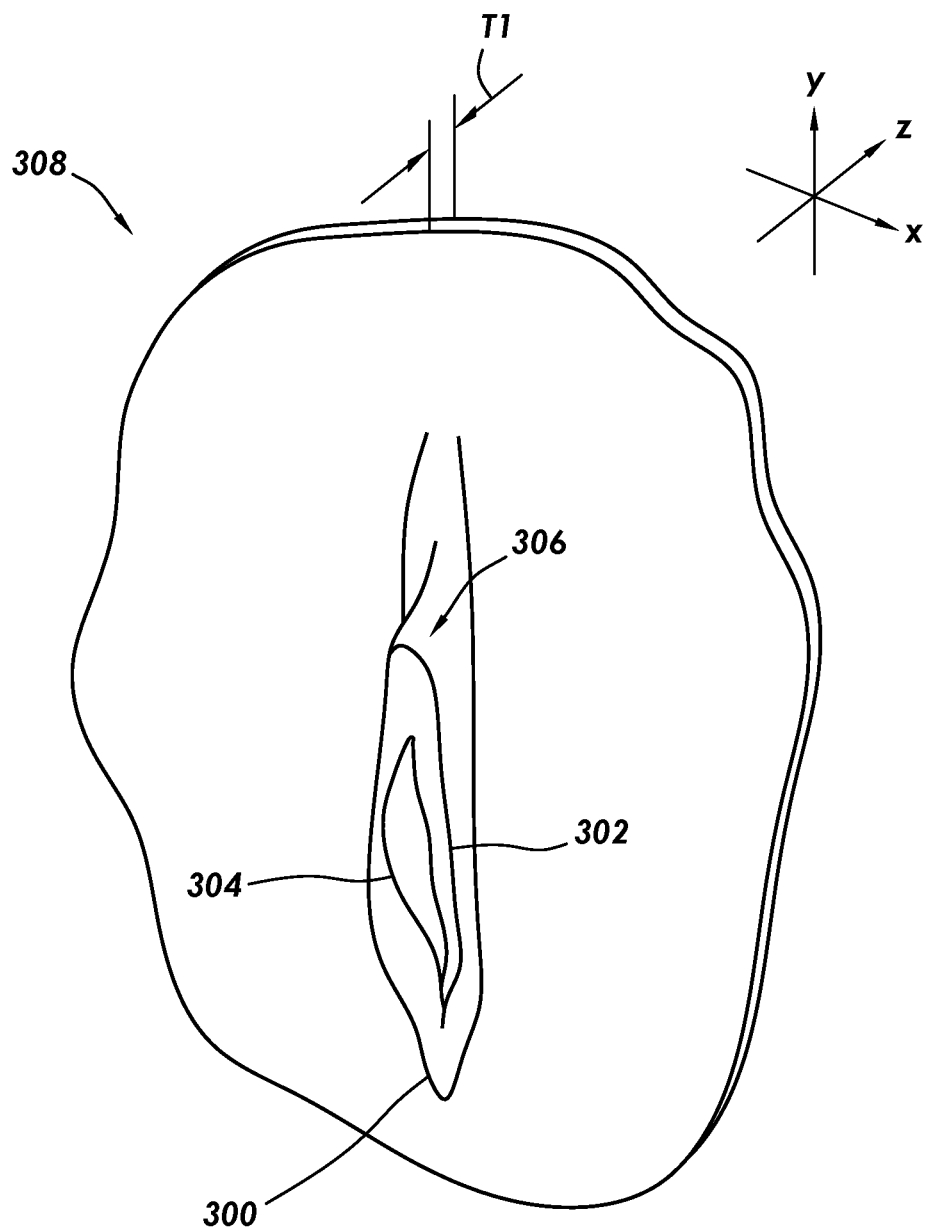
FIG. 3 shows a perspective view of an initial model of anatomical structure in accordance with at least some embodiments.

FIG. 3 shows a perspective view of an initial model of anatomical structure in accordance with at least some embodiments. In particular, the example anatomical structure of FIG. 3 is a simplified drawing of external female genitalia. Visible in FIG. 3 are the perineum 300, labium 302, labium 304, as well as the clitoral hood 306. In example embodiments, the point cloud model produced from the photogrammetry program is an initial model 308. The initial model 308 contains, and as shown depicts, data regarding the outside surface of the anatomical structure in three dimensions, shown as X-Y-Z on the coordinate axis in FIG. 3. Stated otherwise, the initial model 308 has or contains information on the three-dimensional aspects of the outside surface of the anatomical structure. However, depending on the photogrammetry software used, and possibly settings thereof, in example embodiments the initial model 308 itself has very little or no thickness. FIG. 3 shows an example thickness T1 measured along the Z-axis of the coordinate system. The thickness T1 is exaggerated in FIG. 3 for purposes of discussion, but in example embodiments the thickness T1 of the initial model is merely the thickness, if any, of the points within the point cloud.

Figure 4:
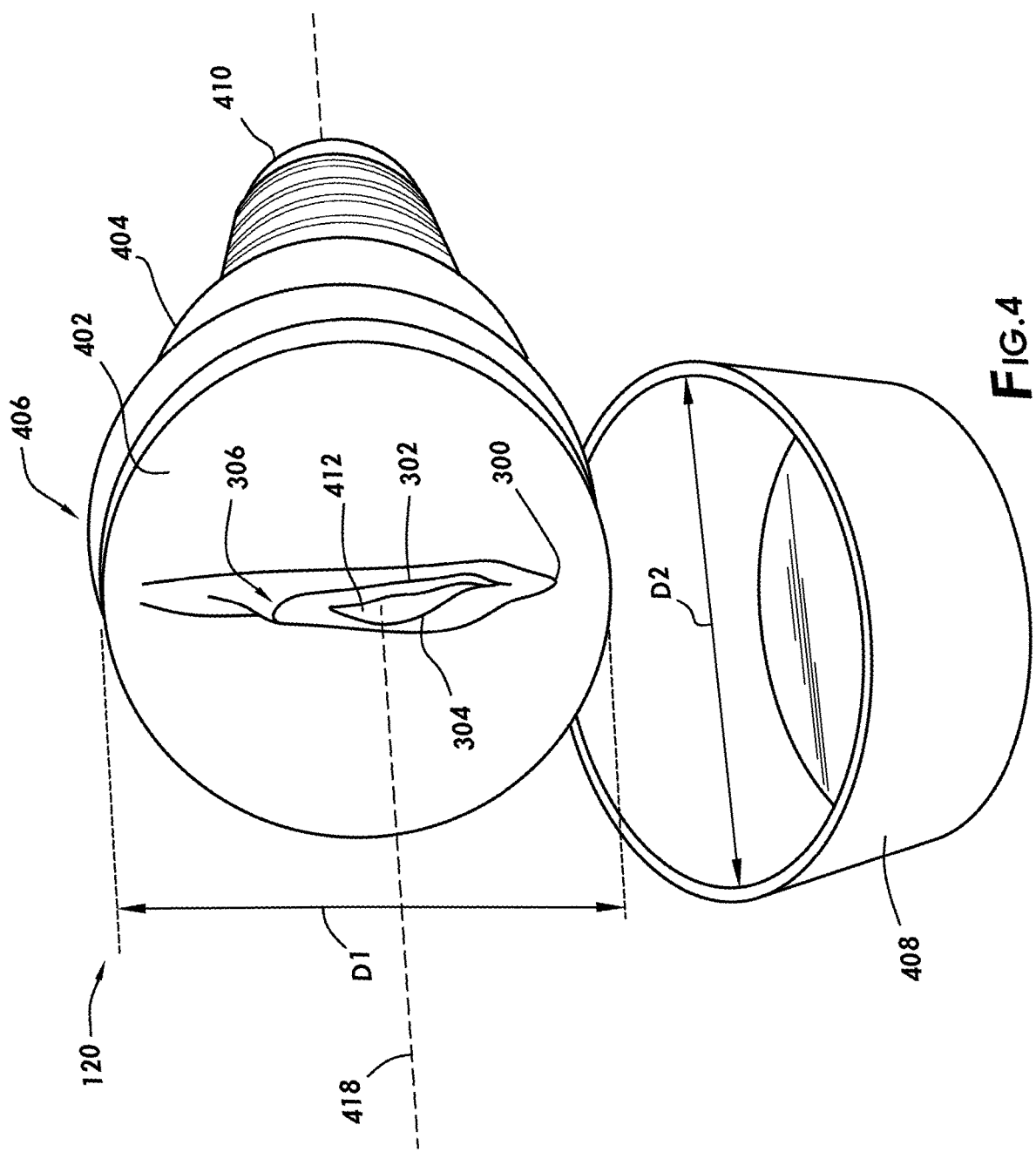
FIG. 4 shows a perspective view of product in accordance with at least some embodiments.

The next step in the example method is cutting the initial model 308 to create a positive model of the anatomical structure (block 206 of FIG. 2). However, before describing in detail the cutting process, description of an example final product will aid in understanding not only various embodiments, but also variants. FIG. 4 shows a perspective view of a final product in the example form of a male masturbation device 120. In particular, the male masturbation device 120 comprises an elastomeric or polymeric sleeve 402 at least partially disposed within an interior volume of an outer cover 404 of rigid material, such as plastic. In the example shown, the outer cover 404 is in the shape of a FLESHLIGHT® brand product, but any suitable shape of the outer cover 404 may be used. In the view of FIG. 4, the insertion end 406 of the polymeric sleeve 402 is visible and includes the replica of the anatomical structure of the subject 100 (FIG. 1). The remaining portions of the polymeric sleeve 402 reside within the outer cover 404. The polymeric sleeve 402 may be made of a thermoplastic elastomer gel (TPE) of low durometer rating, or other material, such as silicon, polyvinyl chloride (PVC), or elastomeric rubber. The example male masturbation device 120 may further comprise a cover or lid 408 that defines an inside diameter D2 slightly larger than the outside diameter of the D1 of the insertion end 406 of the polymeric sleeve 402 such that, when not in use, the lid 408 may be telescoped over the insertion end 406 and couple to the outer cover 404. The lid 408 may, for example, protect the insertion end 106 from damage when not in use. In the example embodiments shown the exterior shape of the outer case 404 is circular having diameter D1 (e.g., three inches), and the circular shape circumscribes the anatomical structure. The male masturbation device 120 may further comprise a second cap or lid 410 that couples to the outer cover 404 opposite the lid 408. The lid 410 may act as a controllable vent mechanism during use.

The insertion end 406 of the example male masturbation device 120 comprises a main aperture 412 which leads to a main passageway (the main passageway not visible in FIG. 4, but discussed more below). As shown, the main aperture 412 is defined between the example labium 302 and labium 304, between the clitoral hood 306 and the perineum 300. In the case of anatomical structure being a mouth, the main aperture 412 would reside between the lips. In the case of the anatomical structure being the anus, the main aperture would be defined by the anus. The main passageway is coaxial with a longitudinal central axis 418 of the polymeric sleeve 402 and the outer cover 404.

Returning briefly to FIG. 2. The next step in the example method is cutting the initial model 308 (FIG. 3) to a predetermined exterior shape circumscribing the anatomical structure (block 206). More particularly still, the next step in the example method is cutting the initial model to have not only the predetermined exterior shape, but also in some cases a predetermined depth. The predetermined depth is related to a distance the polymeric sleeve 402 (FIG. 4) extends beyond the outer cover 404. However, as discussed above the initial model 308 has little or no thickness T1. Thus, prior to cutting, the initial model 308 is stretched or extruded to have a thickness greater than the predetermined depth.

Figure 5:
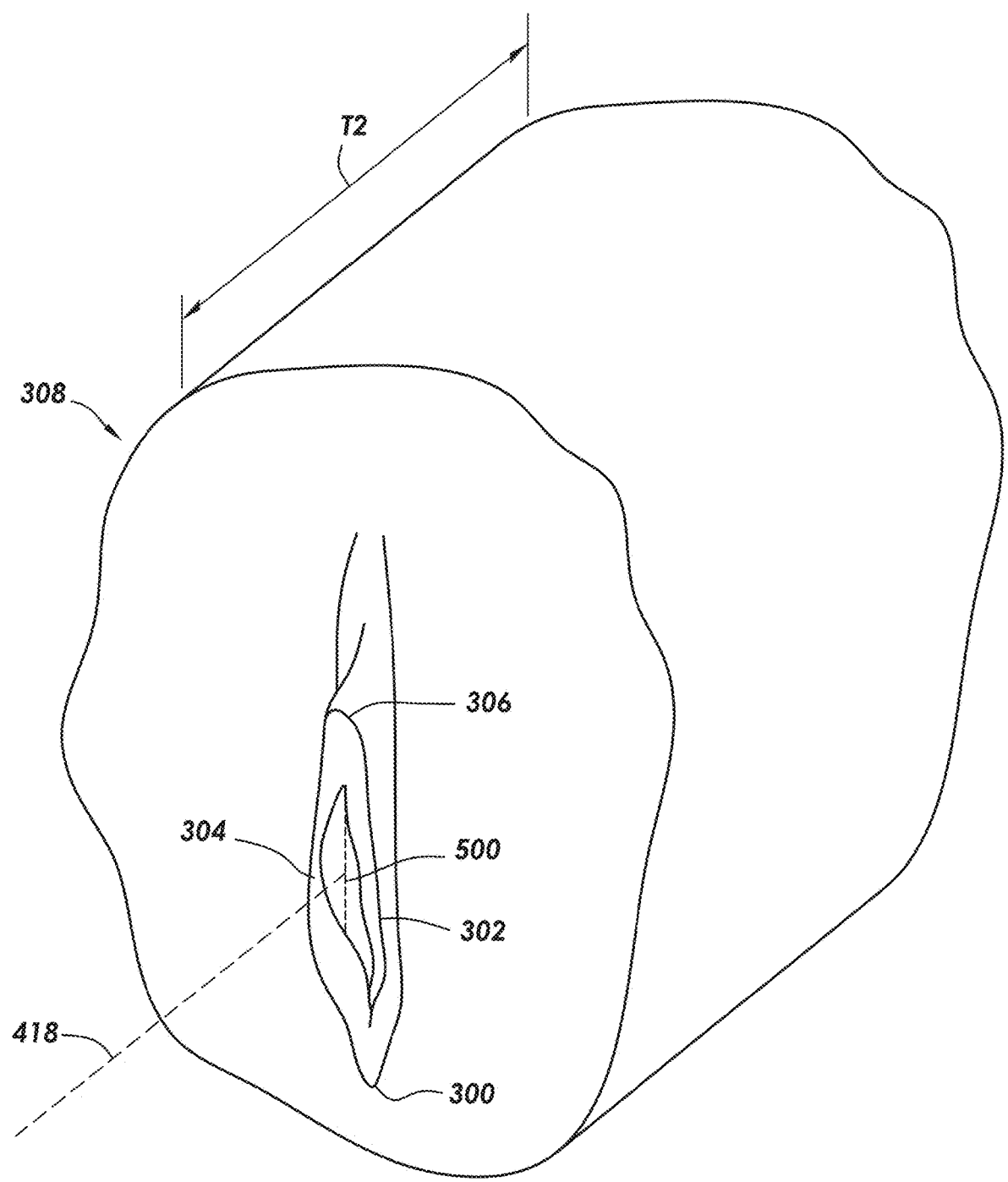
FIG. 5 shows a perspective view of an initial model after extruding, in accordance with at least some embodiments.

FIG. 5 shows a perspective view of an initial model after extruding, in accordance with at least some embodiments. In particular, FIG. 5 shows that the initial model 308 is extruded to have a thickness T2 (and thus define a volume). For reasons that will become clearer below, the thickness T2 is greater than a distance that the polymeric sleeve extends beyond an end of the outer cover. In some cases, extruded thickness T2 is at least one inch, and in some cases three inches or more. To be clear, the initial model 308 is not a physical object; rather, the initial model 308 (both before and after extrusion) is data in an electronic file in any suitable file format. The file containing data regarding the initial model 308 is opened in a digital sculpting software program to perform the extrusion. In example cases, the extrusion of the initial model 308 is performed within ZBRUSH®, a digital sculpting software program available from Pixologic Inc. (pixologic.com).

Cutting the initial model 308 after extrusion involves electronically removing portions of the initial model 308 that are not needed, and then creating a negative image to be a mold for later casting. Prior to the innovations described in this application, a skilled artisan using a sculpting software program, such as the ZBRUSH® brand product, required a day or more to "manually" sculpt away portions of the initial model 308 after extrusion to wind up with a positive model, and then create the negative image to be used as a mold. A day or more per negative mold was too slow and expensive for mass production of replicas of anatomical structures, as each replica is unique and thus has its own negative mold to be used in the casting process. Using the tools, techniques, and methods described below, what once took a day or more to complete can now be completed in less than hour, and in some cases less than half an hour. Moreover, automation can be applied to portions of the process, cutting the time to 15 minutes or less, in some cases 10 minutes or less, and in some cases without human interaction.

In accordance with example embodiments, cutting the initial model 308 after extrusion to have not only the predetermined exterior shape, but also a predetermined depth, to create the positive model can be conceptually described as intersecting or merging of two 3D objects (one of which being the initial model 308), and then removing portions of the initial model 308 that do not intersect the second 3D volume. The inventors of the current application have created several "tools" that speed the process and enable automation. The specification thus turns to a description of example "tools" being a cutting tool object, a mold tool object, and a stem tool object.

FIGS. 6A, 6B, and 6C show side elevation views of three objects in accordance with at least some embodiments. In particular, FIG. 6C shows a cutting tool object 600, FIG. 6B shows a mold tool object 602, and FIG. 6A shows a stem tool object 604. The objects 600, 602, and 604 are not physical objects; rather, the objects are data in one or more electronic files (in any suitable file format) that define the objects, including their three dimensional character. The cutting tool object 600 has a circular cross-section (the cross-section cut in a plane perpendicular to the plane of the page of the figure), with the exception of the tab 606 that helps distinguish the cutting tool object 600 from the mold tool object 602. The cutting tool object defines a central axis 608 perpendicular to and centered within the circular cross-section, and a diameter D3 which in some embodiments is three inches. As discussed more below, the circular cross-section of the cutting tool object 600 may be the predetermined exterior shape that circumscribes the anatomical structure, but other shapes are possible. Moreover, the cutting tool object 600 defines a thickness T3 (measured from the flat surface 610 to the apex 612 of the conical section 614). The example cutting tool object 600 also defines an annular channel 616 that circumscribes the outside surface of the cutting tool object 600. The purpose of the annular channel 616 will become clearer in later discussions.

FIG. 6B further shows an example mold tool object 602. The mold tool object 602 has circular cross-section (the cross-section cut in a plane perpendicular to the plane of the page). The mold tool object 602 also defines a circular disk or knob 618 that not only helps distinguish the mold tool object 602 from the cutting tool object 600, but also helps align the final negative mold in the later described casting. The mold tool object 602 defines a central axis 620 perpendicular to and centered within the circular cross-section, and a diameter D4 greater than the diameter D2. If the diameter D3 of the cutting tool object 602 is three inches, then the diameter D4 will be three inches plus twice a wall thickness of the final negative mold. If the diameter D3 is changed, so too would the diameter D4. As discussed more below, the circular cross-section of the mold tool object 602 likewise defines the predetermined exterior shape that circumscribes the anatomical structure. Moreover, the mold tool object 602 defines a thickness T4 (measured from the flat surface 622 to the apex 624 of the conical section 626).

FIG. 6A further shows an example stem tool object 604. As will become clearer based on the discussion below, the stem tool object 604 helps define the main aperture into the polymeric sleeve. The example stem tool object 604 defines a tab 628 in the form of an inverted conic frustum with a central axis 636. The tab 628 couples to a transition portion 630. The precise form of the transition portion 630 depends on anatomical structure to be replicated. If the anatomical structure is a mouth, then the transition portion defines a long dimension L approximately the width of a mouth (e.g., two inches). If the anatomical structure to be replicated is exterior female genitalia, then the stem tool object 604 may omit either the first wing 632 or the second wing 634 (each wing defined by the dashed lines through the transition portion 630). Finally, if the anatomical structure to be replicated is the anus, then both wings 632 and 634 may be omitted. In some cases, the wings may be electronically removed before use, and in other cases the tools may include three stem tool objects, one for each possible anatomical structure.

Figure 7A:
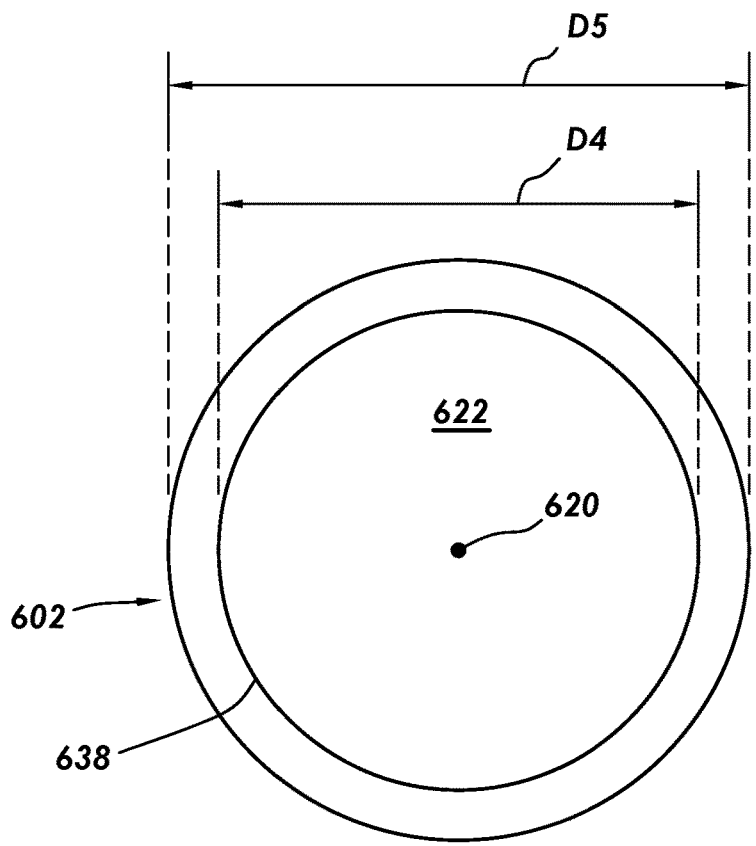
FIGS. 7A and 7B show overhead views of the mold tool object and the stem tool object, respectively, in accordance with at least some embodiments.
Figure 7B:
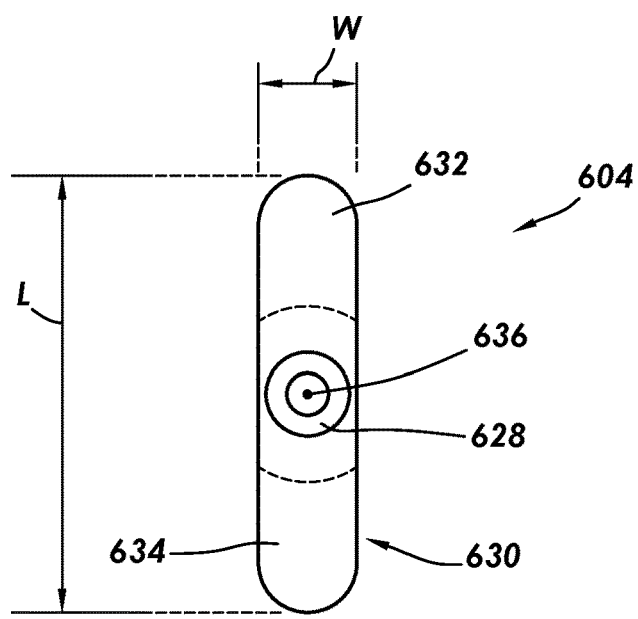

FIGS. 7A and 7B shows overhead views of the mold tool object and the stem tool object, respectively, in accordance with at least some embodiments. In particular, the view of FIG. 7A shows the upper surface 622 of the mold tool object 602, and thus shows that the mold tool object 602 has a circular cross-section. Also visible in FIG. 7A is the central axis 620 of the mold tool object 602, but the central axis 620 is perpendicular to the page in the view of FIG. 7A, and thus the central axis 620 is shown as a dot. In example embodiments, the mold tool object 602 also defines an annular trough 638 on the upper surface 622, where the annular trough 638 is centered within the upper surface 622 and circumscribes the central axis 620. The annular trough 638 defines a diameter D5 smaller than the diameter D4. In example embodiments, the distance between the diameter D4 and the diameter D5 at any location ultimately defines and controls the wall thickness of the final negative mold. A view of the upper surface 610 of the cutting tool object 600 is omitted for brevity, as such would look much like the view of the upper surface 622 of the mold tool object 602, but without the annular trough 638.

FIG. 7B shows an overhead view of the example stem tool object 604. In particular, the view of FIG. 7B shows the tab 628 along with the central axis 636, but the central axis 636 is perpendicular to the page in the view of FIG. 7B, and thus the central axis 636 is shown as a dot. The example transition portion 630 defines an oblong cross-section including the length L, as well as a width W less than half the width L, and in some cases less than a quarter of the width L. The stem tool object 604 is thus for an anatomical structure being a mouth, but by removing one or both of the wings 632 and/or 634 along the curved dashed lines, the stem tool object 604 may be arranged for other anatomical structures.

More precisely now, cutting the initial model 308 to have not only the predetermined exterior shape, and possibly a predetermined depth, to create the positive model can be conceptually described as first intersecting or merging the initial model 308 after extrusion with the cutting tool object 600, and then removing portions of the initial model 308 that do not intersect cutting tool object 600. Referring simultaneously to FIGS. 5 and 6, in example embodiments a center or central axis of the anatomical structure is identified based on the features of the anatomical structure within the initial model 308. In the view of FIG. 4, identifying the features may including: identifying labium 302 and labium 304 of external female genitalia; identifying an intersection the labia, the example intersection shown as dashed line 500; and identifying at least one the perineum 300 or a clitoral hood 306. From some or all the identified features, the longitudinal central axis 418 may be identified, with the center being the intersection of the longitudinal central axis 418 and an outer surface of the initial model 308 (such as at the intersection of the labia shown by dashed line 500). If the anatomical structure to be replicated is the mouth, the features may include the upper lip, the lower lip, the philtra ridge (resulting in the "cupids bow"), and the mentolabial sulcus. Identifying such features may be performed programmatically, such as by software designed to find features (such as facial features) within images, or by a human observer.

Once the center and/or longitudinal central axis 418 is found, the example method may involve merging a cutting tool object 600 with the initial model 308 after extrusion. More precisely, in example embodiments the merging including placing the central axis 608 of the cutting tool object 600 within a predetermined distance of the center of the anatomical structure. In some cases, the central axis 608 is placed parallel to and within a predetermined distance of the longitudinal central axis 418. In yet still other cases, the central axis 608 is placed coaxial with the longitudinal central axis 418. Next, the cutting tool object 600 is intersected with the initial model 308. For example, in the situation where the central axis 608 is coaxial with the longitudinal central axis 418, the cutting tool object 600 is pushed "into" the initial model 308 such that the two intersect in 3D space, and the conical section 614 resides outside or "above" the outside surface of the anatomical structure. Though described as two steps, the placing and intersecting may take place simultaneously.

Figure 8:
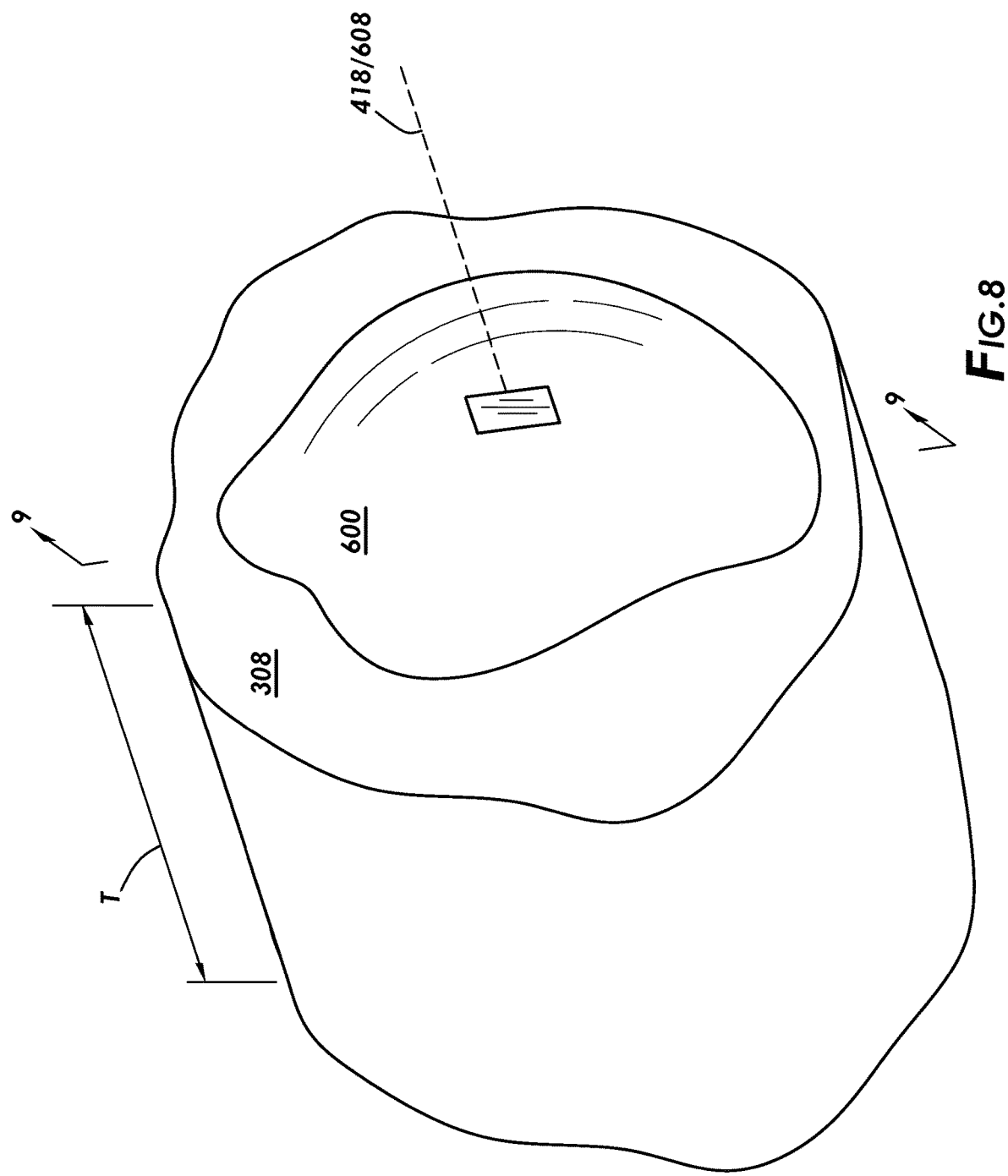
FIG. 8 shows a perspective view of the cutting tool object partially intersected with the initial model, in accordance with at least some embodiments.

FIG. 8 shows a perspective view of the cutting tool object partially intersected with the initial model, in accordance with at least some embodiments. In particular, in the example of FIG. 8 the central axis 608 of the cutting tool object 600 is coaxial with the longitudinal central axis 418 that passes through the center of the anatomical structure (not visible in FIG. 8). As shown, a portion of the volume of the cutting tool object 600 overlaps or intersects with a portion of the volume defined by the initial model 308.

Figure 9:
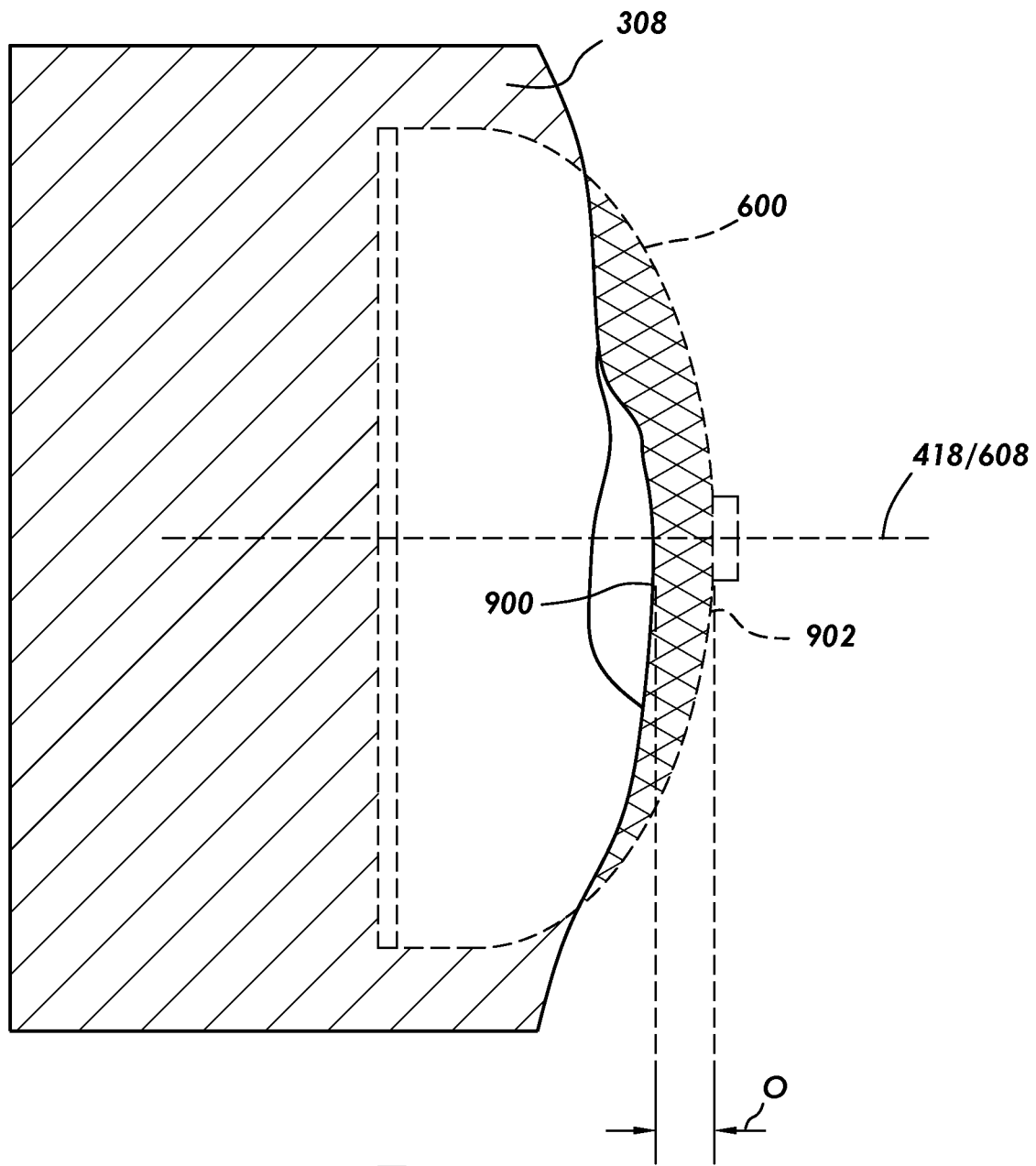
FIG. 9 shows a cross-sectional side view taken along line 9-9 of FIG. 8, in accordance with at least some embodiments.

FIG. 9 shows a cross-sectional view taken along line 9-9 of FIG. 8, in accordance with at least some embodiments. In particular, visible in FIG. 9 is the initial model 308, including a side view of the example anatomical structure in the form of external female genitalia. Also visible in FIG. 9, though shown in dashed lines, is the cutting tool object 600. The cutting tool object 600 is thus intersected with the initial model 308 such that the anatomical structure is approximately centered within the predetermined exterior shape. Moreover, the intersection of the initial model 308 and cutting tool object 600 may stop when a distal-most portion 900 of the anatomical structure resides within a predetermined offset O from an exterior surface 902 of the cutting tool object 600 (e.g., the predetermined offset being a centimeter or less).

Once the relationship of the initial model 308 and the cutting tool object 600 is finalized, the example merging of the model and object proceeds to removing portions of the initial model 308 residing outside the cutting tool object 500. In FIG. 9, the portion removed is shown by single-line cross-hatching. Thereafter, portions of the cutting tool object 600 not intersected by the initial model 308 are removed. In FIG. 9, the portion removed is shown by double-line cross-hatching. The removing steps thus create a positive model. In at least some example systems, the intersecting of the initial model 308 and the cutting tool object 600 is performed in the ZBRUSH® brand sculpting software program. In the specific case of the removing non-intersecting portions, the operation is referred to as Boolean remove, but other sculpting software programs may use different terminology.

Figure 10:
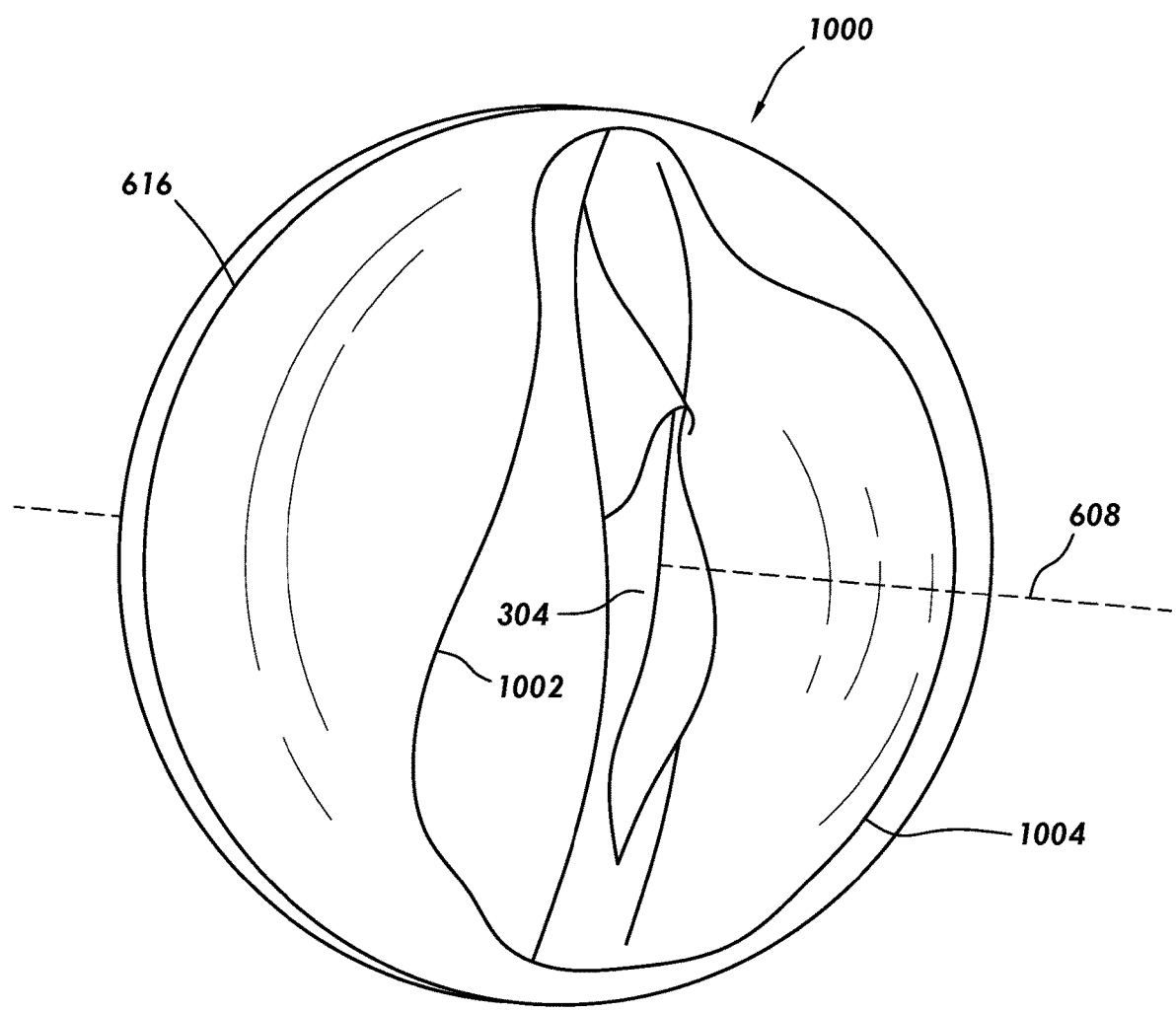
FIG. 10 shows a perspective view of an example positive model, in accordance with at least some embodiments.

FIG. 10 shows a perspective view of an example positive model, in accordance with at least some embodiments. In particular, by cutting the initial model 308 with the cutting tool object 600 as discussed above, what remains is a positive model 1000 showing the anatomical structure circumscribed by the predetermined exterior shape. The positive model 1000 represents the form of the portion of the male masturbation device 120 (FIG. 4) replicated on the exterior surface of the polymeric sleeve 402 (also FIG. 4). Because the positive model 1000 was created from the cutting tool object 600, the positive model 1000 carries along or inherits the central axis 608 (which in some cases is coaxial with the longitudinal central axis 418). Further because the positive model 1000 was created from the cutting tool object 600, the positive model 1000 carries along or inherits annular channel 616. In some example embodiments, the method may immediately to proceed to creating the negative mold (discussed more below) that will be used to cast the polymeric sleeve 402 with the replica anatomical structure. However, in other example embodiments, the positive model 1000 may be manipulated to make the final product more lifelike and/or to implement certain additional features.

Still referring to FIG. 10, the positive model 1000 was created by merging the initial model with the cutting tool object, and then removing portions of the cutting tool object not intersected by the initial model 308. It follows that some of the outer surface the positive model 1000 has texture features carried forward from the initial model, and some of the outer surface will be smooth, having no texture. The boundaries between portions having texture features from the initial model 308 and the smooth surfaces are shown in FIG. 10 by lines 1002 and 1004. For example, that portion of the exterior surface of the positive model to the left of line 1002 may have no texture features, while that portion of the exterior surface of the positive model 1000 (closer to the labium 304) likely has surface texture carried forward from the initial model. In accordance with at least some embodiments, exterior surfaces of the positive model 1000 are smoothed at the sharp transitions (e.g., line 1002) of the positive model. More particularly still, in example cases a zone having a predetermined width (e.g., a centimeter) and centered along the sharp transition may be smoothed by averaging the surface texture across the zone.

Further still, fine detail of skin texture of the subject 100 (FIG. 1) may not be visible in the video and/or still pictures. Even if such skin texture is visible, in the process of creating the initial model some or all of the detail of the skin texture may be lost. Thus, in some example embodiments, certain features of the anatomical structure may be modified to include or enhance the surface texture. For example, the clitoral hood 306, labium 302, and labium 304 may be modified to include or enhance the surface texture to more closely match skin texture. Relatedly, features may be added, such as texture that simulates the presence of hair that was removed prior to capturing the video and/or still pictures of the anatomical structure. If the subject 100 did not adequately prepare the anatomical structure, physical modification may be made, such as "opening" the labia to better define the intersection thereof. The positive model 1000 may also be modified to include the unique identification number of the subject 100, such as along the predetermined exterior shape of the positive model 1000. In cases where the subject 100 is a professional entertainer, the positive model may also be modified to include branding information, such as the subject's stage name, signature, trademark, or other identifying indicia. Regardless of whether the positive model 1000 is modified as discussed above or not, the next step in the example method is creating a negative model of the anatomical structure from the positive model 1000.

Creating the negative model can be conceptually described as intersecting or merging the positive model 1000 with the mold tool object 602, and then removing portions of the mold tool object 602 that intersect positive model. Referring simultaneously to FIGS. 6 and 10, in example embodiments creating the negative model comprises merging the mold tool object 602 with the positive model 1000. In example embodiments, the merging may be by placing the central axis 620 of the mold tool object 602 within a predetermined distance of a center of the positive model 1000. The centering of the positive model 1000 within the mold tool object 602 may be checked and corrected by viewing the relationship of the positive model 1000 to the annular trough 638 (FIG. 7A) on the flat surface 622 of the mold tool object 602. In some cases, the central axis 620 is placed parallel to and within a predetermined distance of the central axis 608. In yet still other cases, the central axis 620 is placed coaxial with the central axis 608, in which case the positive model 1000 is automatically centered. Next, the mold tool object 602 is intersected with the positive model 1000. For example, in the situation where the central axis 620 is coaxial with the central axis 608 of the positive model 1000, the mold tool object 602 is pushed "into" the positive model 1000 such that the two intersect in 3D space, and the conical section 626 resides outside or "above" the outside surface of the anatomical structure in the positive model 1000. Though described as two the steps, placing and intersecting may take place simultaneously.

Figure 11:
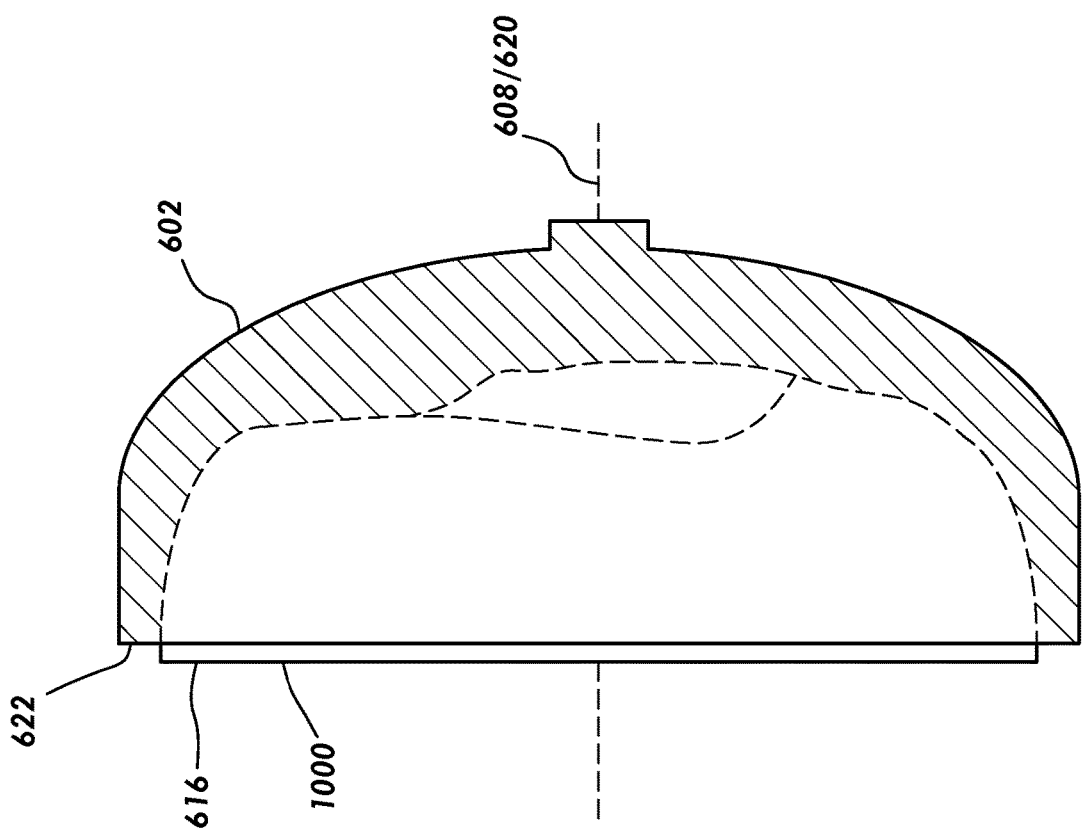
FIG. 11 shows cross-sectional side view of the mold tool object intersected with positive model, in accordance with at least some embodiments.

FIG. 11 shows cross-sectional side view of the mold tool object 602 intersected with positive model 1000, in accordance with at least some embodiments. In particular, in the example of FIG. 11 the central axis 620 of the mold tool object 602 is coaxial with the central axis 608 of the positive model 1000. It is noted that having the central axis 620 and the central axis 608 is not strictly required, but making them coaxial not only speeds the process of merging, but also enables automating the operation. In example embodiments, the mold tool object 602 is intersected with the positive model 1000 by translating along the shared axis until the flat surface 622 of the mold tool object 602 meets the annular channel 616. Thus, the annular channel 616 of the cutting tool object is inherited by the positive model 1000, and becomes a guide for depth alignment the along the central axis 608/620. Once the mold tool object 602 and positive model 1000 are properly aligned, the example method incudes removing portions of the mold tool object 602 that intersect with the positive model 1000, and then removing the positive model 1000. The example portions that remain are shown in FIG. 11 by cross-hatching. What remains is a negative model.

Figure 12:
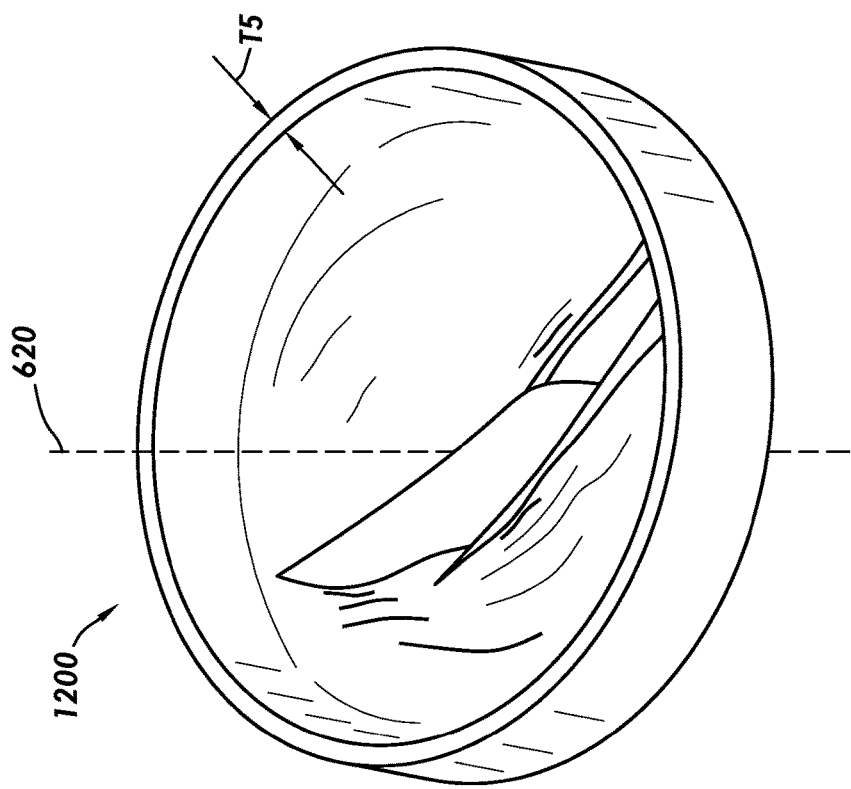
FIG. 12 shows a perspective view of a negative model in accordance with at least some embodiments.

FIG. 12 shows a perspective view of a negative model in accordance with at least some embodiments. In particular, by removing portions of the mold tool object 602 intersected by the positive model 1000 as discussed above, what remains is a negative model 1200 showing a negative version of the anatomical structure circumscribed by the predetermined exterior shape. The negative model 1200 represents a negative of the form of the portion of the male masturbation device 120 (FIG. 4) replicated on the exterior surface of the polymeric sleeve 402 (also FIG. 4). Because the negative model 1200 was created from the mold tool object 600, the negative model 1200 carries along or inherits the central axis 620 from the mold tool object. The negative model 1200 defines a wall thickness T5, in example cases being the distance between diameter D4 and diameter D5 (FIG. 7A). In situations where the replica of the anatomical structure is not intended to have an aperture which leads to a main passageway through the device, the example method may proceed directly to printing the negative model to create the negative mold. However, in embodiments where the final product is to be a male masturbation device, the negative model 1200 is further modified to support creation of main aperture 412 (FIG. 4) and main passageway during the casting process.

Modifying the negative model to support creation of the main aperture and main passageway involves placing the stem tool object 604 on an outside surface of the negative model of the anatomical structure (block 210, FIG. 2). Referring simultaneously to FIGS. 6 and 12, in example embodiments creating the final negative model comprises merging the stem tool object 604 with the negative model 1200. In example embodiments, the merging may be by placing the central axis 636 of the stem tool object 604 within a predetermined distance of a center of the negative model 1200. In some cases, the central axis 636 is placed parallel to and within a predetermined distance of the central axis 620. In yet still other cases, the central axis 636 is placed coaxial with the central axis 620, in which case the stem tool object 604 is automatically centered within the negative model 1200. Next, the stem tool object 604 is abutted against the negative model 1200. For example, in the situation where the central axis 636 is coaxial with the central axis 620 of the negative model 1200, the stem tool object 604 is pushed slightly "into" the negative model 1200 such that the two at least abut, and possibly intersect, in 3D space. Though described as two steps, the placing and abutting may take place simultaneously.

Figure 13:
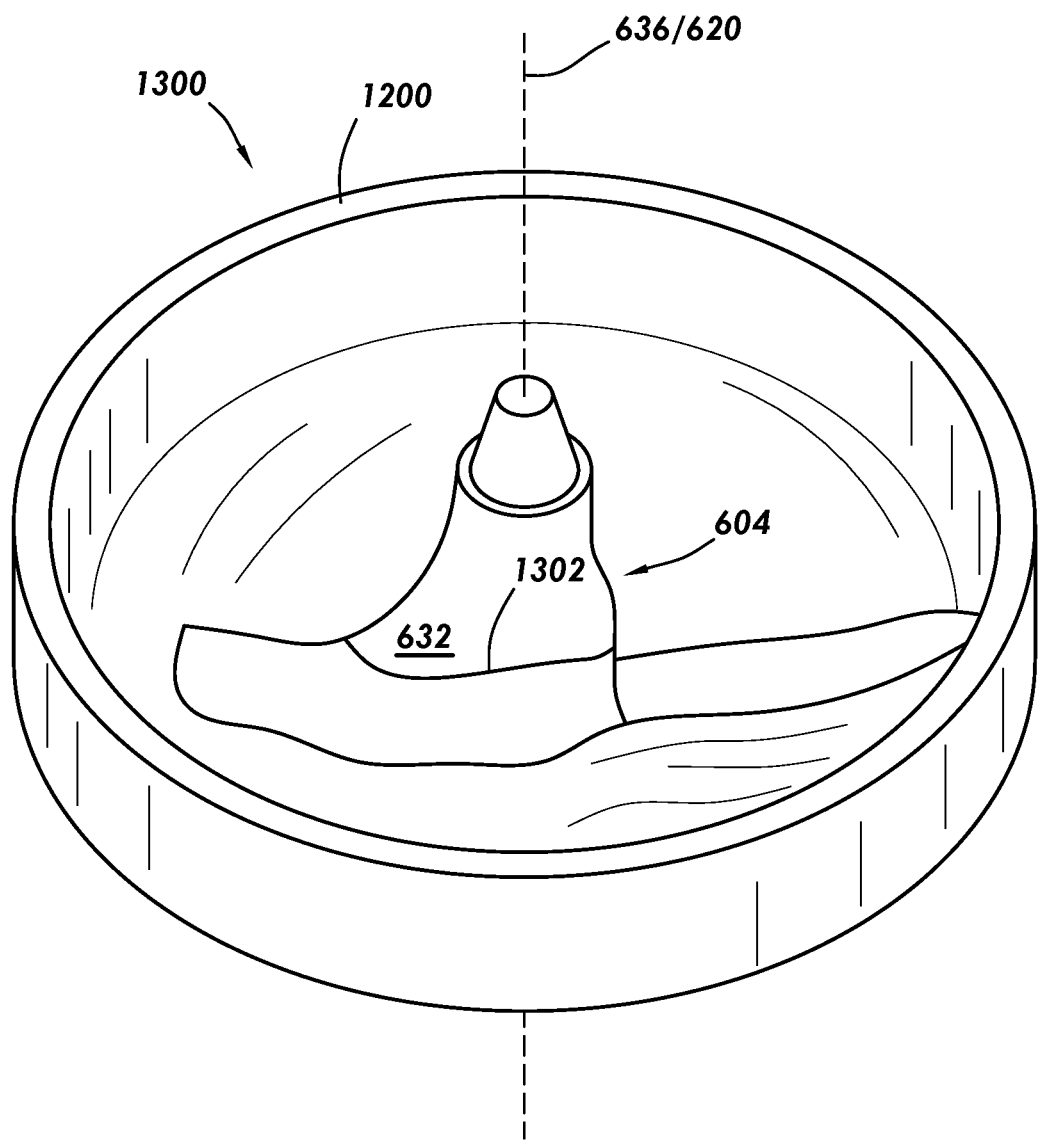
FIG. 13 shows a perspective view of the stem tool object intersected with negative model, in accordance with at least some embodiments.

FIG. 13 shows a perspective view of the stem tool object 604 intersected with negative model 1200, in accordance with at least some embodiments. In particular, in the example of FIG. 13 the central axis 620 of the stem tool object 604 is coaxial with the central axis 620 of the negative model 1200. It is noted that having the central axis 636 and the central axis 620 is not strictly required, but making them coaxial not only speeds the process of merging, but also enables automating the operation. In example embodiments, the stem tool object 604 is intersected with the negative model 1200 by translating along the shared axis until a bottom of the stem tool object 604 abuts the negative model. In the example case of the anatomical structure being external female genitalia, the stem tool object 604 has its length L aligned with the intersection of the labia. Once the stem tool object 604 and negative model 1200 are properly aligned and abutted, the example method incudes merging the stem tool object 604 and negative model 1200 create the final negative model 1300.

Still referring to FIG. 13, the final negative model 1300 was created by merging the stem tool object 604 and the negative model 1200. However, merging of the stem tool object 604 and negative model 1200 may create boundaries having surface texture from the stem tool object 604 different than surface texture from the negative model 1200. An example boundary is shown by line 1302. For example, that portion of the final negative model 1300 below line 1302 may have texture features carried forward (in negative representation) from the positive model, while that portion above the line 1302 has surface texture of the stem tool object 604. In accordance with at least some embodiments, exterior surfaces of the final negative model 1300 are smoothed at the sharp transitions (e.g., line 1302) of the final negative model 1300. More particularly still, in example cases a zone having a predetermined width and centered along the sharp transition may be smoothed by averaging the surface texture across the zone.

The example embodiments of FIGS. 12 and 13 are with respect to the anatomical structure being external female genitalia, and thus the stem tool object 604 comprises only a single wing (or a specific stem tool object would be used). However, if the anatomical structure is the mouth, the stem tool object 604 would have both wings. If the anatomical structure is the anus, both wings would be omitted from the stem tool object 604 (and a specific stem tool object would be used).

The next step in the example method is printing the final negative model 1300 to create a negative mold to be used in the casting process. In at least some example embodiments, the final negative model 1300 is data contained in an electronic file, such as in the .STL format. The data file may be provided to any suitable 3D printer or 3D printer technology, such as fused deposition modeling (FDM), stereolithography (SLA), digital light processing (DLP), selective laser sintering (SLS), selecting laser melting (SLM), laminated object manufacturing (LOM), or digital beam melting (EBM). For example, the 3D printer may be a FORMLABS 3D printer available from FORMLABS, Inc. In yet still other example embodiments, the final negative model 1300 may be printed on a 3D SYSTEMS printer available from 3D SYSTEMS Inc. (e.g., the 3D SYSTEMS model FIG. 4). That is, by way of the 3D printer 112 (FIG. 1), the final negative model 1300 becomes a physical thing, termed herein a negative mold. Thus, FIG. 13 shows not only the final negative model 1300, but also shows an example of a negative mold printed from the negative model.

Returning to FIG. 1. The 3D printer 112 thus prints the negative mold 116 to be used in the casting process. In example systems, the 3D printer 112 uses a liquid resin harden by focus of laser light, but any suitable 3D printing technology may be used. Once the 3D printer 112 completes the printing, the negative mold 116 is removed from printer, and any support structures created are removed. In order to remove residual resin, the negative mold 116 may be subjected to an alcohol wash. Depending on parameters associated with the casting process (e.g., temperature of liquid polymer), the negative mold 116 may need to be cured, such as by baking the negative mold 116 in an oven. Depending on properties of the resin and/or the casting process, the curing step may be omitted. The specification now turns to an example casting process.

Figure 14:
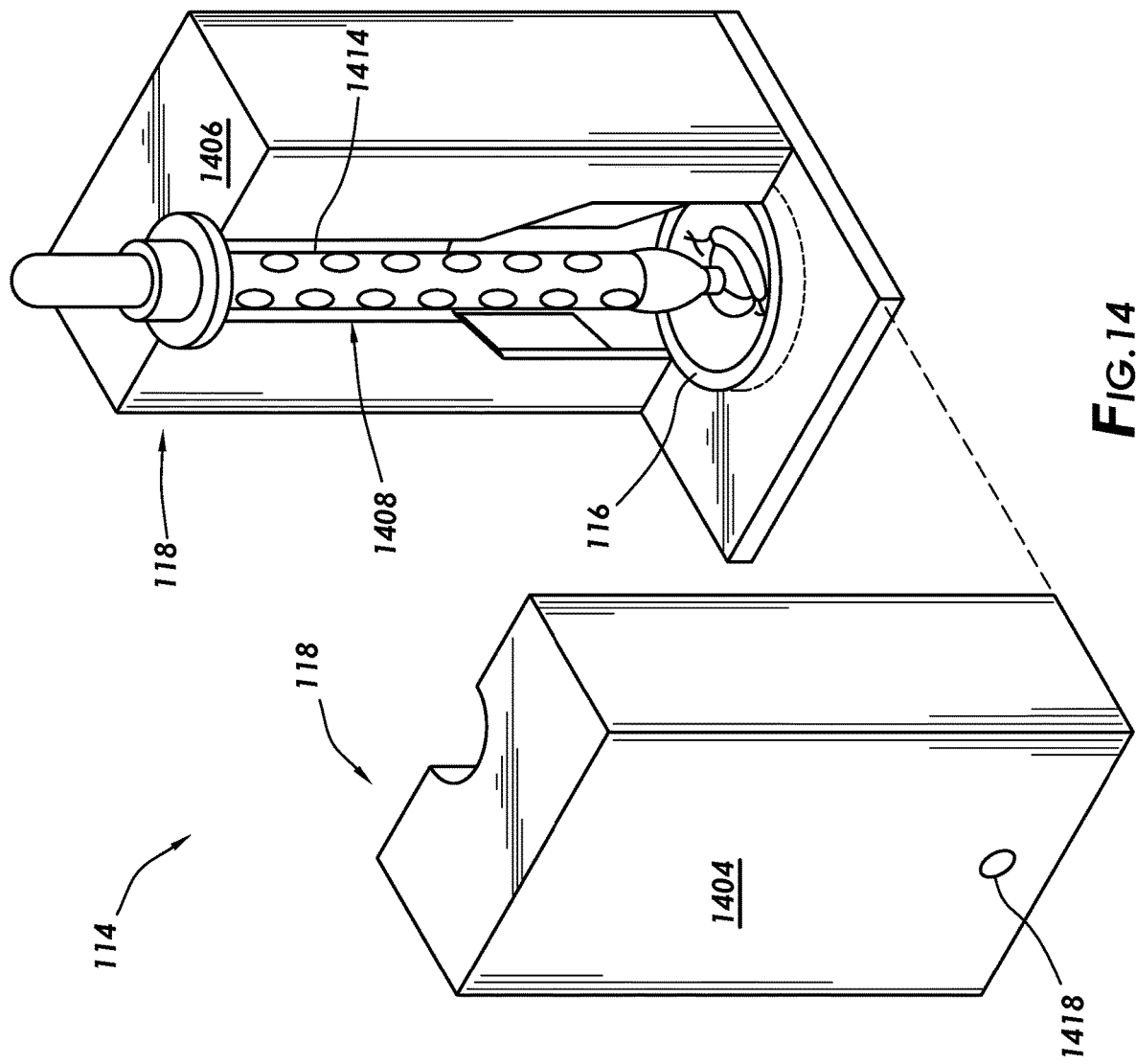
FIG. 14 shows a perspective view of a cast system in accordance with at least some embodiments.

FIG. 14 shows a perspective view of a cast system 114 in accordance with at least some embodiments. In particular, FIG. 14 shows an example outer mold assembly 118 comprising first mold member 1404 and second mold member 1406. Each mold member 1404 and 1406 defines an interior surface, but in the view of FIG. 14 only the interior surface 1408 of mold member 1406 is visible. The interior surface 1408 of mold member 1406 forms half of a negative image of a portion of the exterior surface of the polymeric sleeve 402 (FIG. 4), and in particular the portion of the polymeric sleeve 402 that resides within the outer cover 404 (FIG. 4). Likewise, the interior surface of the mold member 1404 forms the other half of the negative image of the polymeric sleeve 402.

The cast system 114 further comprises negative mold 116 placed in operational relationship to the interior surfaces defined by the outer mold assembly 118. As discussed in detail above, the negative mold 116 structurally defines a negative image of the outer portions of the insertion end 406 (FIG. 4) of the polymeric sleeve 402 (FIG. 4). Stated otherwise, the negative mold 116 defines a negative image of the anatomical structure, and is used to cast the insertion end 406 of the polymeric sleeve 402. In some example systems, first mold member 1404 and second mold member 1406 may be milled from metallic material, such as aluminum. Further in example embodiments, the negative mold 116 is made on demand, such as by 3D printing techniques, discussed above. The negative mold 116 couples to a rod member 1414. An exterior surface of the rod member 1414 defines the negative image of the interior surface of the main passageway through the polymeric sleeve 402.

The casting or molding process may involve placing the negative mold 116 in operational relationship to the outer mold assembly 118, and coupling the rod member 1414 to the tab 628 (not visible in FIG. 14) of the negative mold 116 crated by merging the negative model with the stem tool object. The outer mold assembly 118 is closed around the various components and held in place in some fashion. The polymeric material in liquid form is injected through an injection port into the volume defined by the interior surface 1408, such as injection through injection aperture 1418. The polymeric material in liquid form fills the volume defined by the negative mold 116 and interior surface 1408, displacing the air, and then the polymeric material is allowed to cure. Once cured, the outer mold assembly 118 is again opened, the rod member 1414 withdrawn from the main passageway, and the polymeric sleeve 402 may be removed from the negative mold 116. Trimming of the polymeric sleeve 402 may be performed, such as to remove the polymeric material that cured inside the injection aperture, and any mold seams or marks formed by the interface of the outer mold assembly. In some cases, the polymeric sleeve 402 created may be treated with compound to reduce surface tension (such as by application of talcum powder). Thereafter, the polymeric sleeve 402 may be placed in an outer cover 404, and shipped to the subject 100.

The various embodiments discussed to this point have assumed that the subject 100 commissions creation of the male masturbation device 120 for a mate. It follows that the replica of the anatomical structure embodied in the male masturbation device 120 will likely be a one-off device created from video and/or still pictures. However, the subject 100 may be a professional model, uploading data with the goal of selling replica of an anatomical structure to the general public. Such a professional subject 100 may have incentive to better control the replica creation process. For example, the subject 100 may provide information for creation of male masturbation devices directly in a suitable point cloud format, bypassing certain of the steps discussed above. Similarly, the professional subject 1000 may directly provide the initial model having all desired surface textures, signatures, trademarks, and the like. In such a case, the example process may proceed directly to creation of the positive model 1000 and subsequent steps. Thus, depending on the sophistication of the subject 100 and the goals of the on-demand creation of negative models and casting, certain of the steps discussed above may be omitted.

The various embodiment discussed to this point have assumed that the replica of the anatomical structure will have a main passageway, and thus be a male masturbation device. However, it is also possible to create replicas of external male genitalia (e.g., penis and testicles), in either a physically aroused state or flaccid state. In such situations, the main passageway is omitted, along with the related considerations (e.g., use of a stem tool). Moreover, when casting external male genitalia with no main passageway, in some cases the polymeric or elastomeric material may be cast at room temperature (e.g., from a two-component mixture creating a silicone gel). Because of the room temperature casting, single use mold assemblies need not be as temperature resilient. All these considerations taken together, the initial model created by the photogrammetry software may be passed directly to the 3D printer. To the extent a software sculpting program is used, such would be clean up, adding of identifying indicia, and in the case of professionals, signatures, trademarks, and the like. The initial model (which is directly the positive model) may be passed directly to the 3D printer, which in some cases has a "shell tool" that can automatically create and print a negative mold from the initial model. Such shell tools are not applicable to the replicas of anatomical structures that are not stand alone 3D structures, and that include main passageways.

Figure 15:
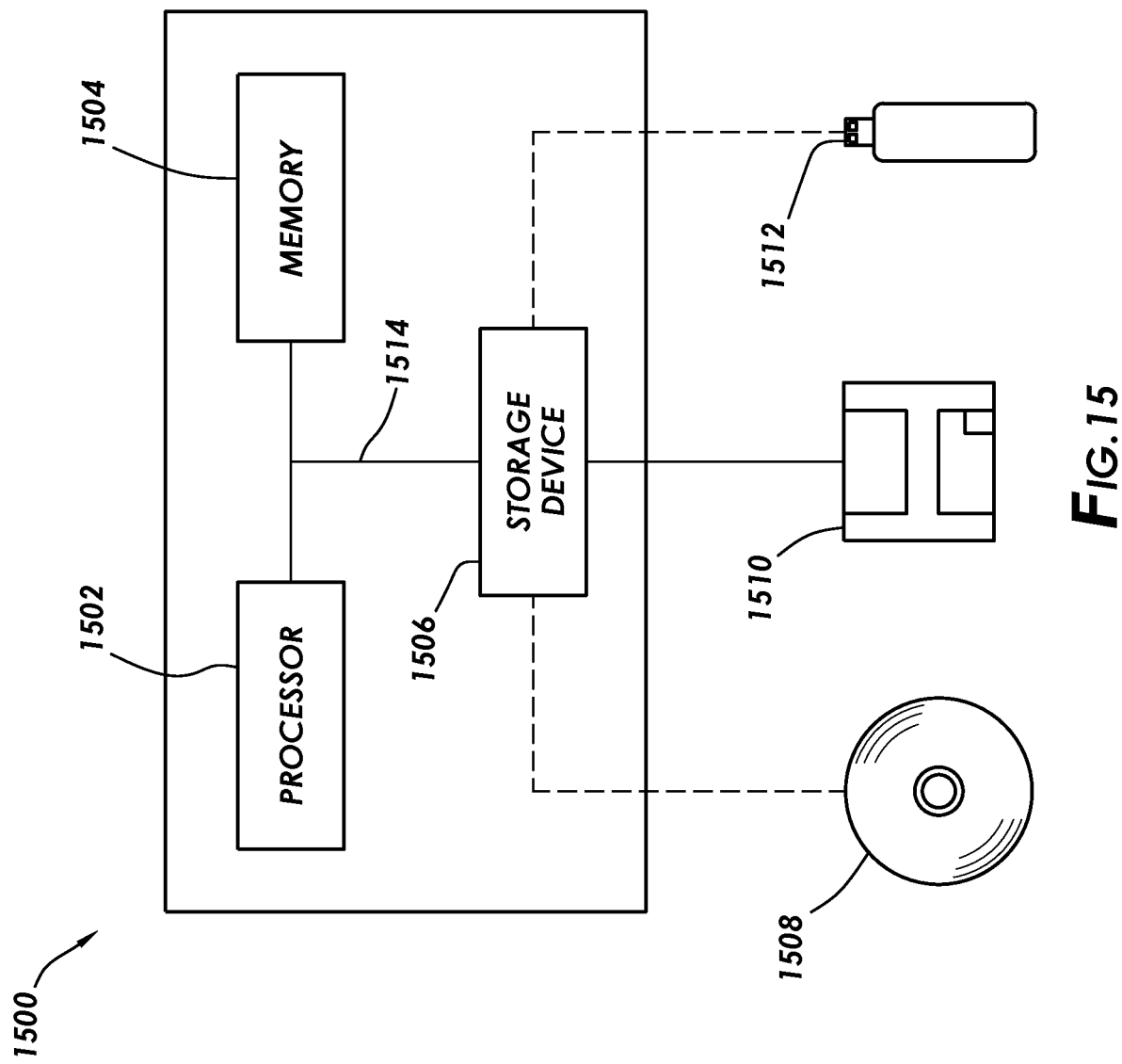
FIG. 15 shows a computer system in accordance with at least some embodiments.

The example replica system 102 contains two or more computer systems. FIG. 15 shows a computer system in accordance with at least some embodiments. The computer system 1500 is an example of the customer interface computer system 108, and/or the mold creation computer system 110. The example computer system 1500 comprises a processor 1502 coupled to a memory 1504 and a storage system or long term storage device 1506. The processor 1502 may be any currently available or after-developed processor, or group of processors. The memory 1504 may be random access memory (RAM) which forms the working memory for the processor 1502. In some cases, data and programs may be copied from the storage device 1506 to the memory 1504 as part of the operation of the computer system 1500.

The long term storage device 1506 is a device or devices that implement non-volatile long-term storage, which may also be referred to as a non-transitory computer-readable media. In some cases, the long term storage device is a hard drive or solid state drive, but other examples include optical discs 1508, "floppy" disks 1510, and flash memory devices 1512. The various programs used to implement the programmatic aspects discussed may thus be stored on the long term storage device 1506, and executed by the processor 1502. Relatedly, creation and interaction of the various objects and models of the various embodiments may be implemented by the processor 1502 and communicated to the storage device 1506 (including the example optical disc 1508, floppy disk 1510, flash memory device 1512, or magnetic tape) by way of a telemetry channel 1514. In other words, the storage device 1506 may store instructions that, when executed by the processor, perform any of the programmatic steps discussed above.

Figure 16:
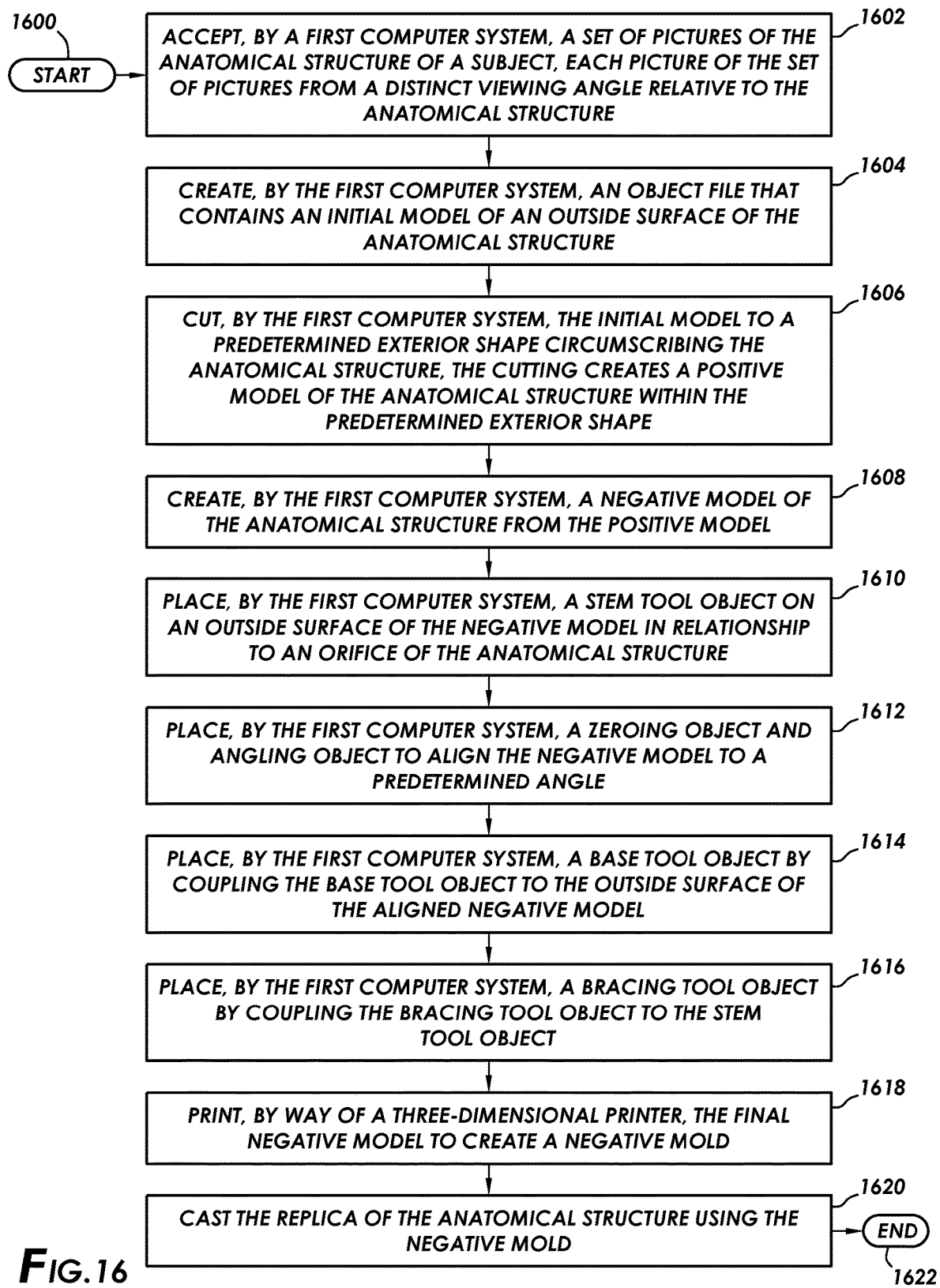
FIG. 16 shows a method in accordance with at least some embodiments.

FIG. 16 shows a method in accordance with at least some embodiments. The method includes series of steps performed by a combination of the mold creation computer system 110, the 3D printer 112, and the cast system 114. FIG. 16 is presented as a high level overview of an example process to create a replica of an anatomical structure in accordance with example embodiments. FIG. 16 serves as an organizational guide to the balance of the discussion. The example method starts (block 1600) and comprises: accepting, by a first computer system, a plurality of pictures of the anatomical structure of a subject, each picture of the plurality of pictures from a distinct viewing angle relative to the anatomical structure (block 1602); creating, by the first computer system, an object file that contains an initial model of an outside surface of the anatomical structure (block 1604); cutting, by the first computer system, the initial model to a predetermined exterior shape circumscribing the anatomical structure, the cutting creates a positive model of the anatomical structure within the predetermined exterior shape (block 1606); creating, by the first computer system, a negative model of the anatomical structure from the positive model (block 1608); placing, by the first computer system, a stem tool object on an outside surface of the negative model in an abutting relationship to an orifice of the anatomical structure, and thereby creating a final negative model (block 1610); placing, by the first computer system, a zeroing object and angling object to align the negative model to predetermined angle (block 1612); placing, by the first computer system, a base tool object by coupling the base tool object to the outside surface of the aligned negative model to create a finalized negative model (1614); place, by the first computer system, a bracing tool object coupling the bracing tool object to the stem tool object; printing, by way of a three-dimensional printer, the final negative model to create a negative mold (block 1616); and casting the replica of the anatomical structure using the negative mold (block 1618). Thereafter the method ends (block 1620), though the process likely begins anew with a new set of pictures of an anatomical structure of another subject. Each step will be addressed in turn, and in greater detail.

The steps performed at blocks 1602, 1604, 1606, 1608, 1610, 1618, and 1620 of the method in FIG. 16 may be performed in a similar manner as described herein with reference to blocks 202, 204, 206, 208, 210, 212, and 214 respectively, of the method in FIG. 2. In some embodiments, the steps may be performed by a single computer system including one or more processing devices executing computer instructions implementing the steps and stored on one or more memory devices. In some embodiments, the steps may be performed by multiple computer systems including multiple processing devices executing computer instructions implementing the steps and stored on multiple memory devices.

For ease of reference, the blocks 1602, 1604, 1606, 1608, and 1610 will now be briefly summarized.

The first step in the example method is accepting a plurality of pictures of the anatomical structure of the subject 100, each picture of the plurality of pictures from a distinct viewing angle relative to the anatomical structure (block 1602). In the example system, the accepting of the plurality of pictures is by the mold creation computer system 110 (FIG. 1) from the customer interface computer system 108 (also FIG. 1). However, in other cases the mold creation computer system 110 may receive the plurality of pictures directly or through any suitable intermediate computer system. In some example cases, the mold creation computer system 110 receives or accepts the plurality of pictures in the form of a video comprising a plurality of frames. The video may be obtained by an imaging device (e.g., camera) that is moved over the target in a drone-like manner (e.g., a zig-zag pattern) to enable more thoroughly capturing images of the target.

Next, the example method creates an object file that contains an initial model of an outside surface of the anatomical structure (block 1604). That is, the initial model is a digital representation of the outside surface of the anatomical structure in any suitable file format. For example, the initial model may be series of points in a three-dimensional space, where each point defines the vertex of a triangle, and where all the triangles viewed together give the visual appearance of a three-dimensional object. Example file formats for the initial model include files in an ".OBJ" geometry definition, files in a stereolithography ".STL" definitions, as well as any currently available or after-developed file format that represents three-dimensional surfaces.

In accordance with at least some embodiments, extracting the plurality of pictures, and creating the object file, may be accomplished by supplying the plurality of pictures to a photogrammetry program, such as 3DF Zephyr produced by 3Dflow of Verona, Italy. Other photogrammetry programs, including after-developed photogrammetry programs, may be equivalently used. The example 3DF Zephyr accepts video and/or still pictures in a variety of file formats, and produces a point cloud model of the scene in the pictures in an .OBJ format.

FIG. 3 shows a perspective view of an initial model of anatomical structure in accordance with at least some embodiments. In particular, the example anatomical structure of FIG. 3 is a simplified drawing of external female genitalia. In example embodiments, the point cloud model produced from the photogrammetry program is an initial model 308. The initial model 308 contains, and as shown depicts, data regarding the outside surface of the anatomical structure in three dimensions, shown as X-Y-Z on the coordinate axis in FIG. 3.

The next step in the example method is cutting the initial model 308 to create a positive model of the anatomical structure (block 1606 of FIG. 16). In some embodiments, an artist may modify the positive model from block 1606 to create the finished anatomical structure. Further, in some embodiments, a file including the positive model and finished anatomical structure may be reviewed by quality control and approved and a signature or other identifier of a person may be added. The cutting of the initial model 308 (FIG. 3) may be performed within a predetermined exterior shape circumscribing the anatomical structure (block 206). More particularly, the next step in the example method is cutting the initial model to have not only the predetermined exterior shape, but also in some cases a predetermined depth. The predetermined depth is related to a distance the polymeric sleeve 402 (FIG. 4) extends beyond the outer cover 404. The initial model 308 is not a physical object; rather, the initial model 308 (both before and after extrusion) is data in an electronic file in any suitable file format. The file containing data regarding the initial model 308 is opened in a digital sculpting software program to perform the extrusion. In example cases, the extrusion of the initial model 308 is performed within ZBRUSH®, a digital sculpting software program available from Pixologic Inc. (pixologic.com).

Cutting the initial model 308 after extrusion involves electronically removing portions of the initial model 308 that are not needed, and then creating a negative image to be a mold for later casting. Various tools that expedite the process for cutting the initial model and generating a negative model are presented in FIGS. 6A, 6B, and 6C. As previously described, FIGS. 6A, 6B, and 6C show side elevation views of three objects in accordance with at least some embodiments. In particular, FIG. 6C shows a cutting tool object 600, FIG. 6B shows a mold tool object 602, and FIG. 6A shows a stem tool object 604.

The tool objects may be used to electronically merge with one or more other models, tools, and/or objects presented in a three-dimensional (3D) space and electronically cause removal of portions of various models, tools, and/or objects. The tools and/or techniques described herein may provide one or more technical solutions to accurately removing portions of models, tools, and/or objects at precise pixel locations such that a negative model produced may not include excess model data (e.g., reduced file memory size) of a subject to be replicated. In other words, the negative model may include a reduced set of model data to be used to create a negative mold, which may reduce computing resources (e.g., processing, memory, and/or bandwidth) by accurately and efficiently cutting the initial model to a precise representation of a subject. By using the reduced set of model data, a processing device may process the data quicker and may not waste processing cycles or memory device resources. Further, physical materials may be saved using the disclosed technique as the accurately represented negative model may cause the printer to use just the right amount of physical resources needed to create an accurate negative mold of a subject without wasting physical resources.

As discussed above, FIG. 12 shows a perspective view of a negative model in accordance with at least some embodiments. In particular, by removing portions of the mold tool object 602 intersected by the positive model 1000 as discussed above, what remains is a negative model 1200 showing a negative version of the anatomical structure circumscribed by the predetermined exterior shape. The negative model 1200 represents a negative of the form of the portion of the male masturbation device 120 (FIG. 4) replicated on the exterior surface of the polymeric sleeve 402 (also FIG. 4). Because the negative model 1200 was created from the mold tool object 600, the negative model 1200 carries along or inherits the central axis 620 from the mold tool object.

Modifying the negative model to support creation of the main aperture and main passageway involves placing the stem tool object 604 on an outside surface of the negative model of the anatomical structure (block 1610, FIG. 16). Referring simultaneously to FIGS. 6 and 12, in example embodiments creating the final negative model comprises merging the stem tool object 604 with the negative model 1200 in 3D coordinate space.

Figure 18:
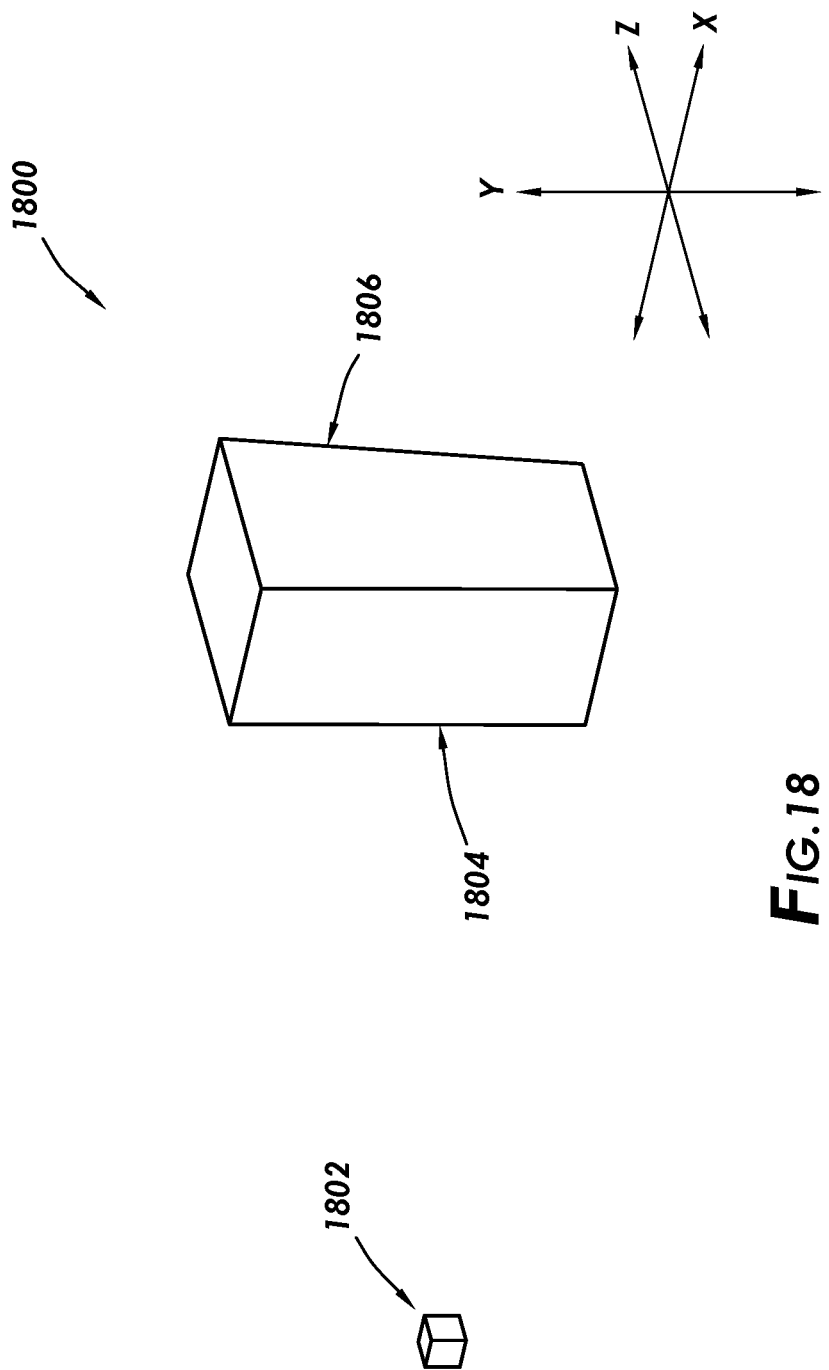
FIG. 18 shows a perspective view of a zeroing tool and an angling tool in accordance with at least some embodiments.

In some embodiments, a processing device of a first computer system may place a zeroing object and an angling object to align the negative model to a predetermined angle (block 1612, FIG. 16). An example zeroing object 1802 and angling object 1804 are presented in a three-dimensional (3D) coordinate space 1800 of FIG. 18.

The zeroing object 1802 may refer to a 3D modeling object that has a depth and a dimension of a certain shape. In some embodiments, the zeroing object 1802 may have a cube shape, although any suitable shape may be used. The zeroing object 1802 may have a small size relative to other objects included in the 3D coordinate space 1800. For example, the zeroing object 1802 has a reduced size compared to the angling object 1804 in the 3D coordinate space. In some embodiments, the zeroing object 1802 may include a cube having a height of 5 pixel, a width of 5 pixels, and a length of 5 pixels in the 3D coordinate space. The zeroing object may be placed in the 3D coordinate space 1800 at an origin location to function as a reference point when placing, aligning, configuring, etc. other objects in the 3D coordinate space 1800. The size of the zeroing object 1802 may be kept small to reduce an amount of memory (e.g., file size) and/or processing resources consumed by the computer system implementing the zeroing object in the 3D coordinate space.

The angling object 1804 may refer to a 3D modeling object that has a depth and a dimension of a certain shape. In some embodiments, the angling object 1804 may include walls having straight edges and one wall 1806 having an angled edge. The angled wall 1806 may be configured to a predetermined angle degree (e.g., 1 degree to 20 degrees) relative to the XY plane in FIG. 18. The angling object 1804 may be used to cause a negative model to be aligned at the predetermined angle. Such a technique may enable maintaining a round shape of the negative mold created using the negative model when the negative mold is printed because the circular cross-section thus spans more than one vertical plane in the three-dimensional print space.

Figure 17:
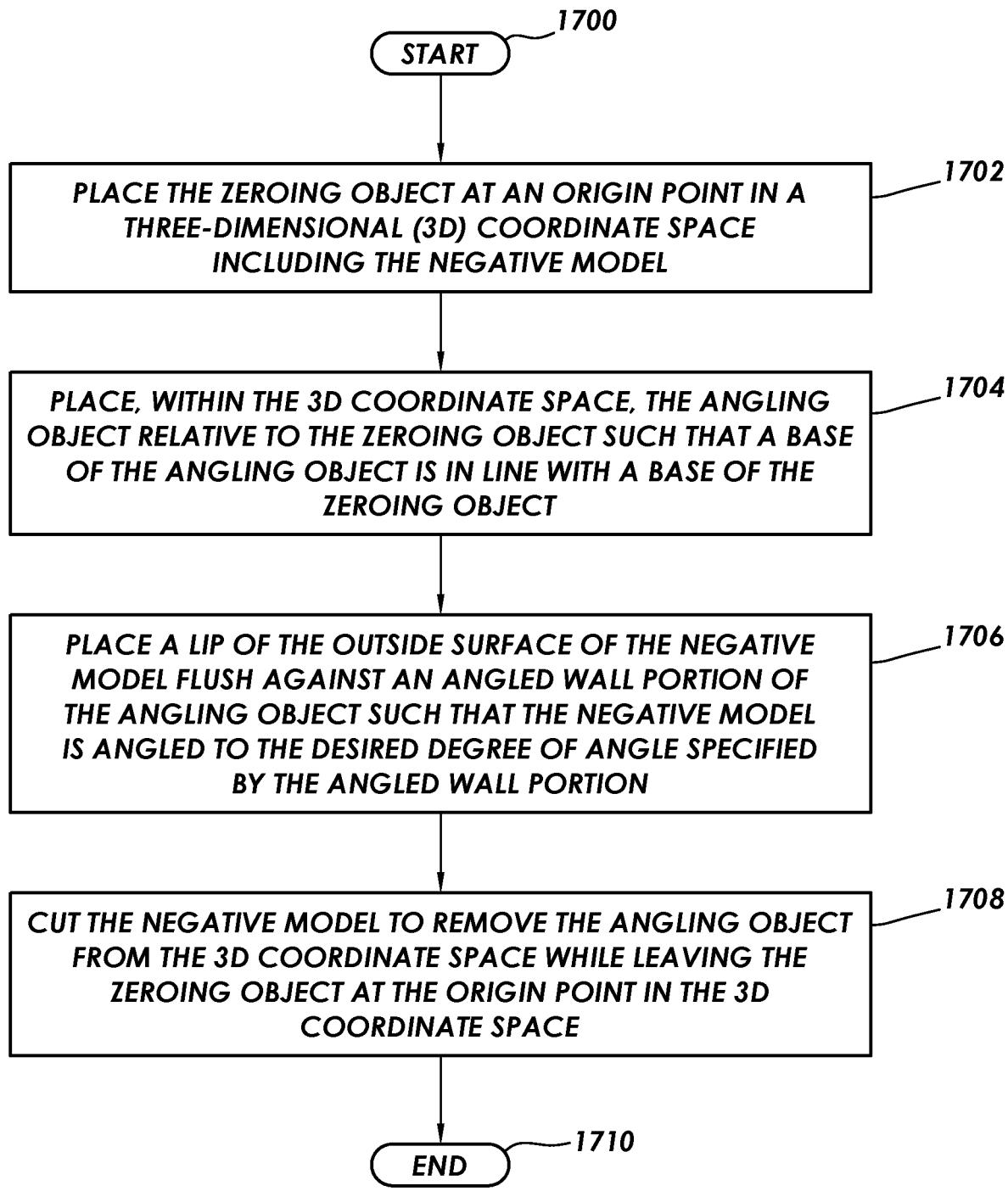
FIG. 17 shows a method in accordance with at least some embodiments.

FIG. 17 shows a method for placing the zeroing object 1802 and angling object 1804 in accordance with at least some embodiments. Thus, the method of FIG. 17 may be performed as sub-steps of block 1612 of the method presented in FIG. 16. The method in FIG. 17 includes series of steps performed by a combination of the mold creation computer system 110, the 3D printer 112, and the cast system 114. The example method starts (block 1700) and comprises: placing the zeroing object at an origin point in a three-dimensional (3D) coordinate space comprising the negative model (block 1702); placing, within the 3D coordinate space, the angling object relative to the zeroing object such that a base of the angling object is in line with a base of the zeroing object (block 1704); and placing a lip of the outside surface of the negative model flush against an angled wall portion of the angling object, such that the negative model is angled to the desired degree of angle specified by the angled wall portion (block 1706); and cutting the negative model to remove the angling object from the 3D coordinate space while leaving the zeroing object at the origin point in the 3D coordinate space (block 1708). Thereafter the method ends (block 1710), though the process likely begins anew when generating a subsequent final negative model to use for a negative mold. Each step will be addressed in turn, and in greater detail.

Figure 19:
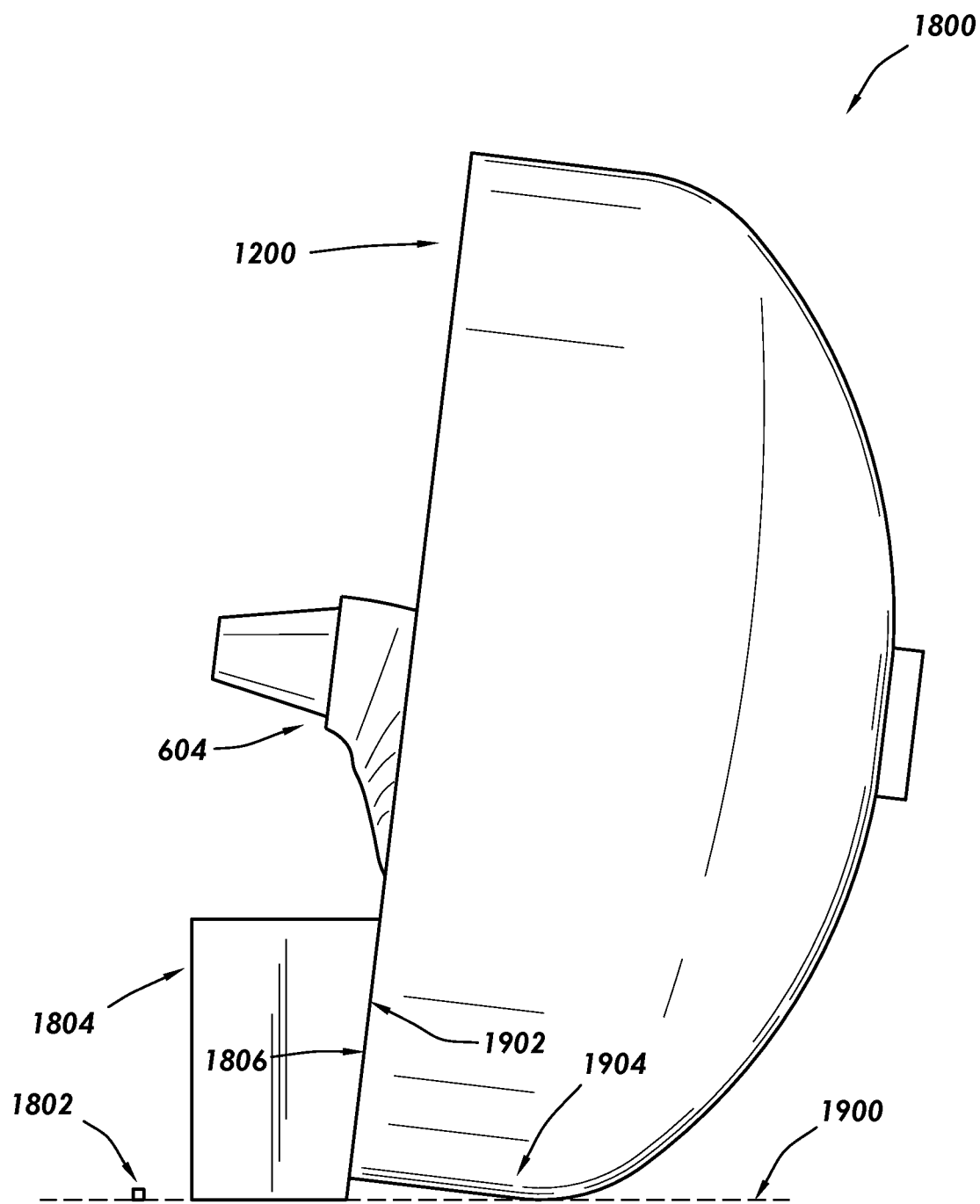
FIG. 19 shows a side view of the zeroing tool and an angling tool included with a negative model in accordance with at least some embodiments.

FIG. 19 shows a side view of the zeroing object 1802 and the angling object 1804 included with a negative model 1200 in accordance with at least some embodiments. As depicted, block 1702 includes placing the zeroing object 1802 at the origin point in the 3D coordinate space 1800 including the negative model 1200. The origin point may be a predetermined location in the 3D coordinate space 1800 having specified pixel coordinates. The pixel coordinates of the location of the origin point may be represented in a matrix format (e.g., 2D, 3D, 4D, etc.), for example. It is noted that the placing of the zeroing object 1802 at the origin may be performed only once, and the file digitally saved such that, for future operations a file already exists with the zeroing object 1802 at the correct location.

At block 1704, the processing device may place, within the 3D coordinate space 1800, the angling object 1804 relative to the zeroing object 1802 such that a base of the angling object 1804 is in line with a base of the zeroing object 1802. As depicted, dotted line 1900 is used to illustrate that the base of the zeroing object 1802 and the base of the angling object 1804 are aligned on a horizontal axis in the 3D coordinate space 1800. The angling object 1804 may be placed a predetermined fixed distance from the zeroing object 1802 to ensure a certain amount of clearance between the negative model 1200 and the zeroing object 1802. Again, the placing of the angling object 1804 may be performed only once and in the same file with the zeroing object 1802, and again the file digitally saved such that, for future operations a file already exists with the zeroing object 1802 and the angling object 1804 at the correct locations.

For example, the zeroing object 1802 and the angling object 1804 may be combined as a combined object that is saved in a single file. That is, each of the zeroing object 1802 and the angling object 1804 included in the combined object may be saved respective at locations in the 3D coordinate space in the single file and then the combined object may be combined with the negative model 1200 into another file. Accordingly, in some embodiments, the zeroing object 1802 and the angling object 1804 may not be placed individually each time a final negative model is generated, but may be combined together in a single digital file and saved once, and then used repeatedly with differing negative models. Merging the single tool with the negative model 1200 may ensure that the negative model 1200 is oriented at the proper location in the 3D coordinate space 1800 and angled at the predetermined angle degree.

At block 1706, the processing device may place a lip 1902 of the outside surface of the negative model 1200 flush against an angled wall 1806 portion of the angling object 1804, such that the negative model 1200 is angled to the desired degree of angle specified by the angled wall 1806 portion. Aligning the lip 1902 may include tilting the negative model 1200 in the 3D coordinate space 1800 by the predetermined angle of the angled wall 1806 portion. As depicted, aligning the lip 1902 of the outside surface of the negative model 1200 flush against the angled wall 1806 portion causes at least a majority of a side 1904 to be raised off of the dotted line 1900. Raising the majority of the side 1904 in such a way may prevent the majority of the side from being attached to a flat platform surface during 3D printing. In some embodiments, a minority portion of the side 1904 may be in contact with the dotted line 1900. In some embodiments, the zeroing object 1802 and/or the angling object 1804 may be placed automatically via computer instructions configured to place the objects 1802 and/or 1804 at predetermined locations. In some embodiments, the objects 1802 and/or 1804 may be placed in the sculpting program (e.g., ZBRUSH® brand product).

Figure 20:
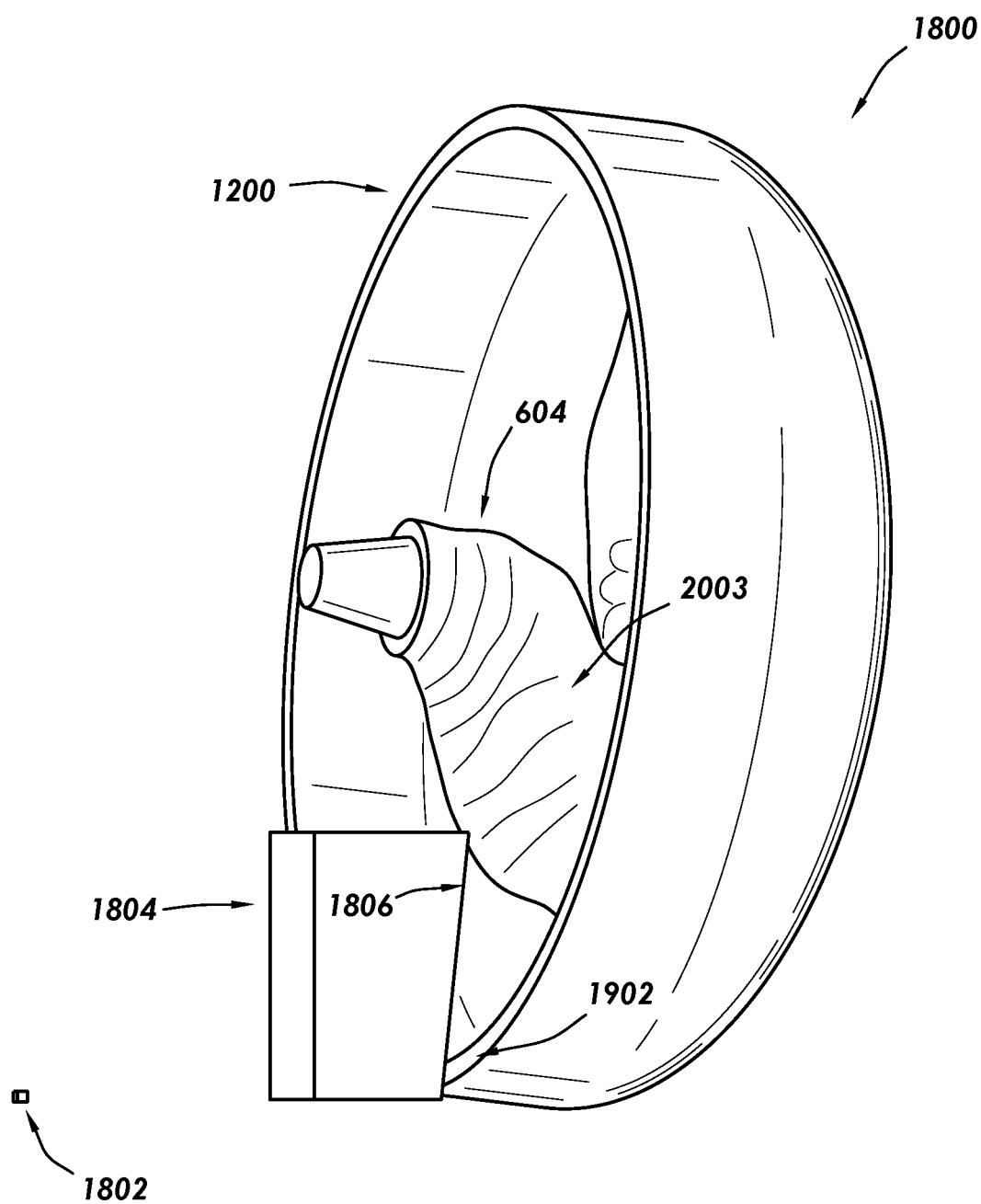
FIG. 20 shows a perspective view of the zeroing tool and an angling tool included with the negative model in accordance with at least some embodiments.

FIG. 20 shows a perspective view of the zeroing tool 1802 and the angling tool 1804 included with the negative model 1200 in accordance with at least some embodiments. FIG. 20 depicts a different perspective of the lip 1902 of the negative model 1200 being placed flush against the angled wall 1806 portion of the angling object 1804. At block 1708, the processing device may cut the negative model 1200 to remove the angling object 1804 from the 3D coordinate space 1800 while leaving the zeroing object 1802 at the origin point in the 3D coordinate space 1800. The placement of the negative model 1200 flush against the angling object 1804 in the 3D coordinate space 1800 may enable placement of the negative model 1200 at the correct location in the 3D coordinate space. Ensuring the negative model 1200 is at the correct location may enable proper placement of the base tool object and/or bracing tool object described further below.

The resulting negative model 1200 and the zeroing object 1802 may be saved as a .STL file format and opened in a slicing software program that instructs the 3D printer how to print the negative mold. The slicing software program may merge one or more other objects, tools, and/or models with the negative model 1200 to generate a final negative model.

Returning to FIG. 16, in some embodiments, a processing device of a first computer system may place a base tool object 2100 by coupling the base tool object to the outside surface of the aligned negative model (block 1614, FIG. 16). The .STL file may be open in the slicing software program. Initially, the .STL file may include the zeroing object 1802 and the negative model 1200 (with the angling object 1804 previously being removed in the ZBRUSH brand product).

Figure 21A:
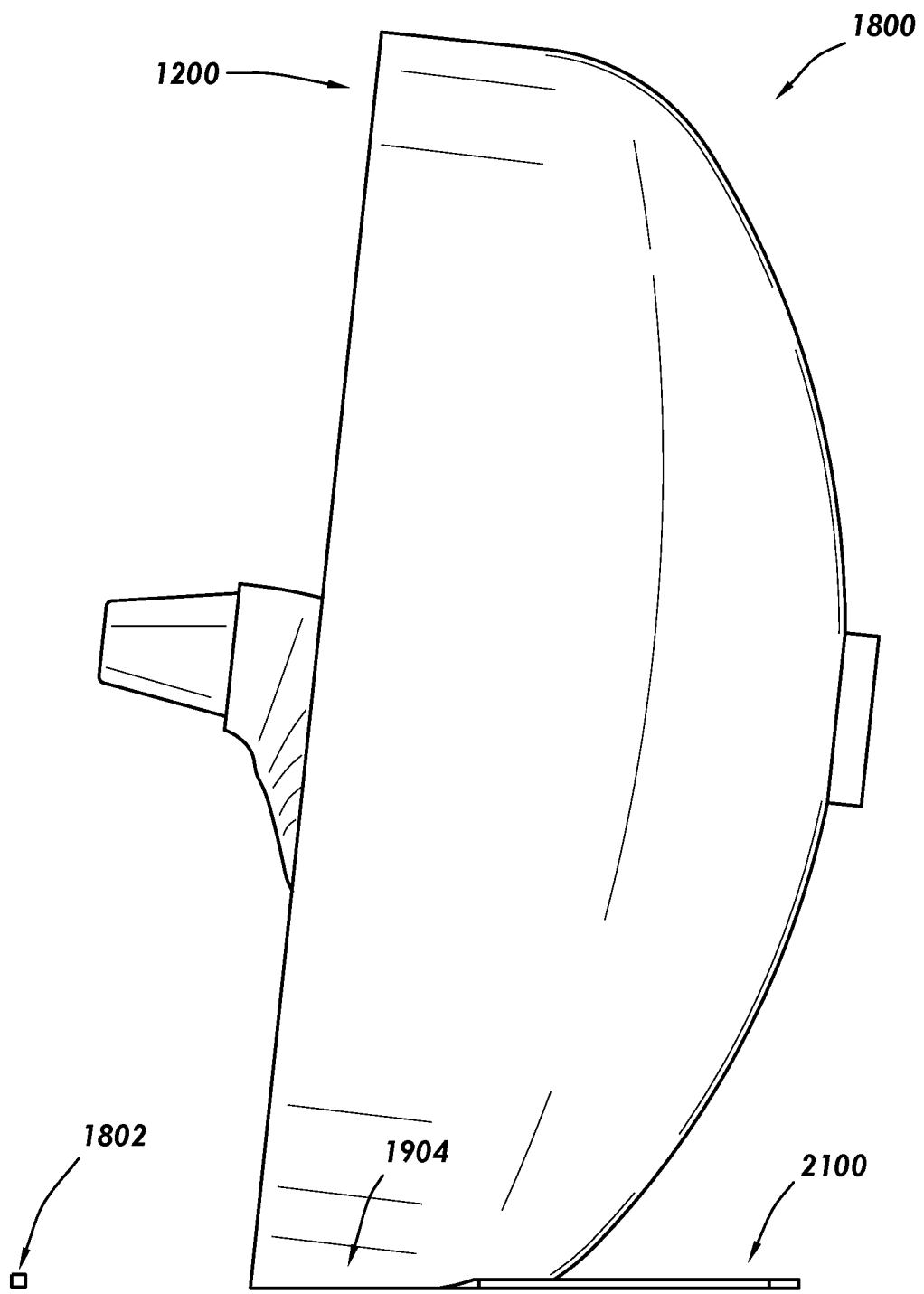
FIG. 21A shows a side view of a base tool object included with the negative model in accordance with at least some embodiments.

For example, in FIG. 21A, the 3D coordinate space 1800 may be modified by the slicing software program to merge the base tool object 2100 with the negative model 1200. In some embodiments, the base tool object 2100 may be configured to support the negative mold, when printed, at the predetermined angle the negative model 1200 was tilted based on the angling object 1804.

Figure 21B:
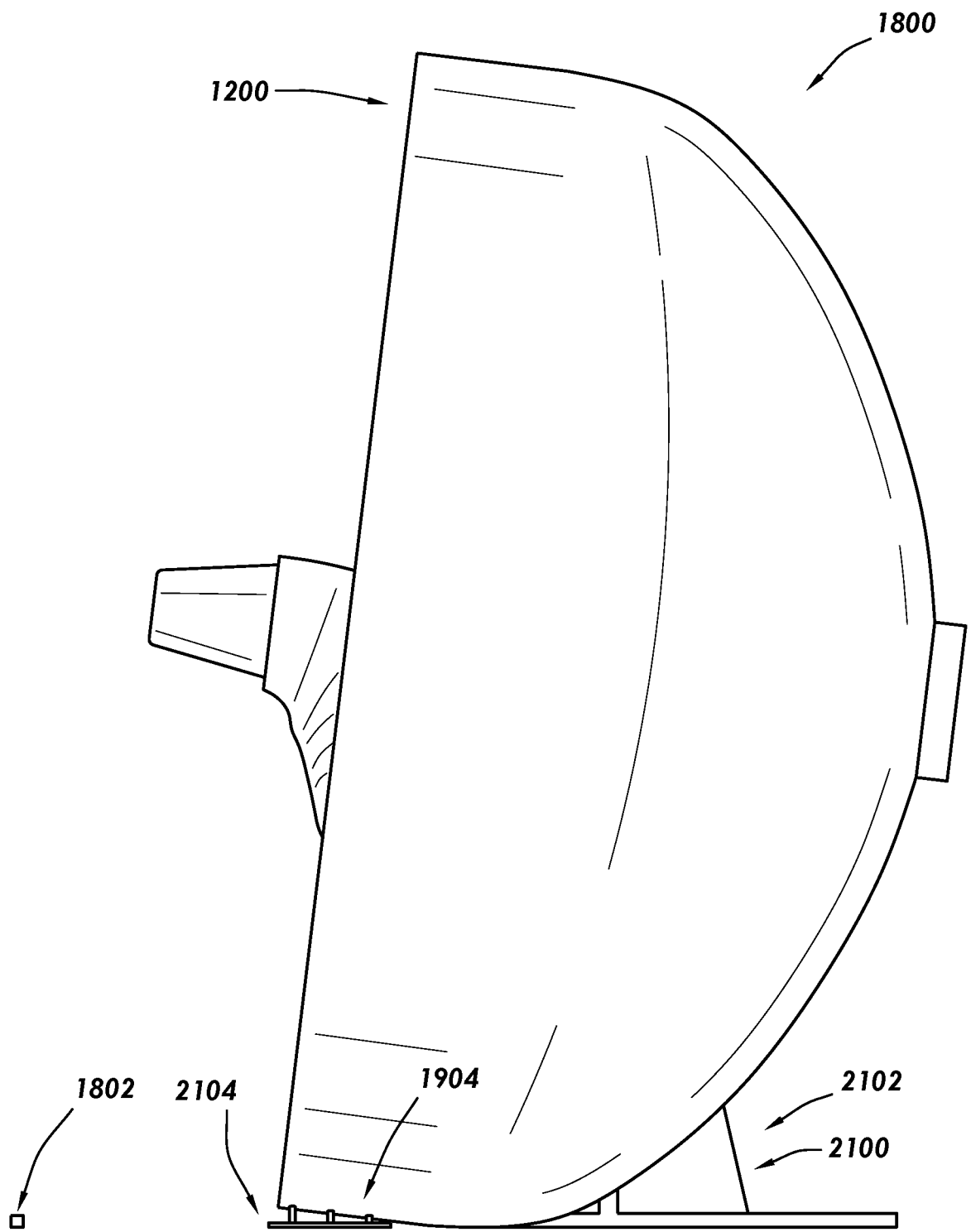
FIG. 21B shows a side view of a base tool object included with the negative model in accordance with at least some embodiments.

The base tool object 2100 may refer to a 3D modeling object that has a depth and/or a dimension. As depicted in FIG. 21B, the base tool object 2100 may include a rear portion 2102 and a front portion 2104. The front portion 2104 may include one or more prongs that couple to the raised side 1904. The base tool object 2100 may be configured to attach to a flat platform of the 3D printer when the negative model 1200 is used to print the negative mold. The base tool object 2100 may be configured to secure the negative mold to the platform as layers are being printed and may enable maintaining the angle of tilt of the negative mold away from the flat surface such that a round shape of the negative mold is maintained during printing. In some embodiments, the base tool object 2100 may be placed in the 3D coordinate space 1800 by coupling the base tool object 2100 to the negative model 1200 using the zeroing object 1802. For example, a base of the base tool object 2100 may be aligned with a base of the zeroing object 1802. In some embodiments, the base tool object may be located at particular coordinates in the 3D coordinate space and saved as a separate file. A software program may merge the negative model 1200 and the base tool object 2100 based on their coordinate locations in the 3D coordinate space such that the two objects are merged.

Figure 22:
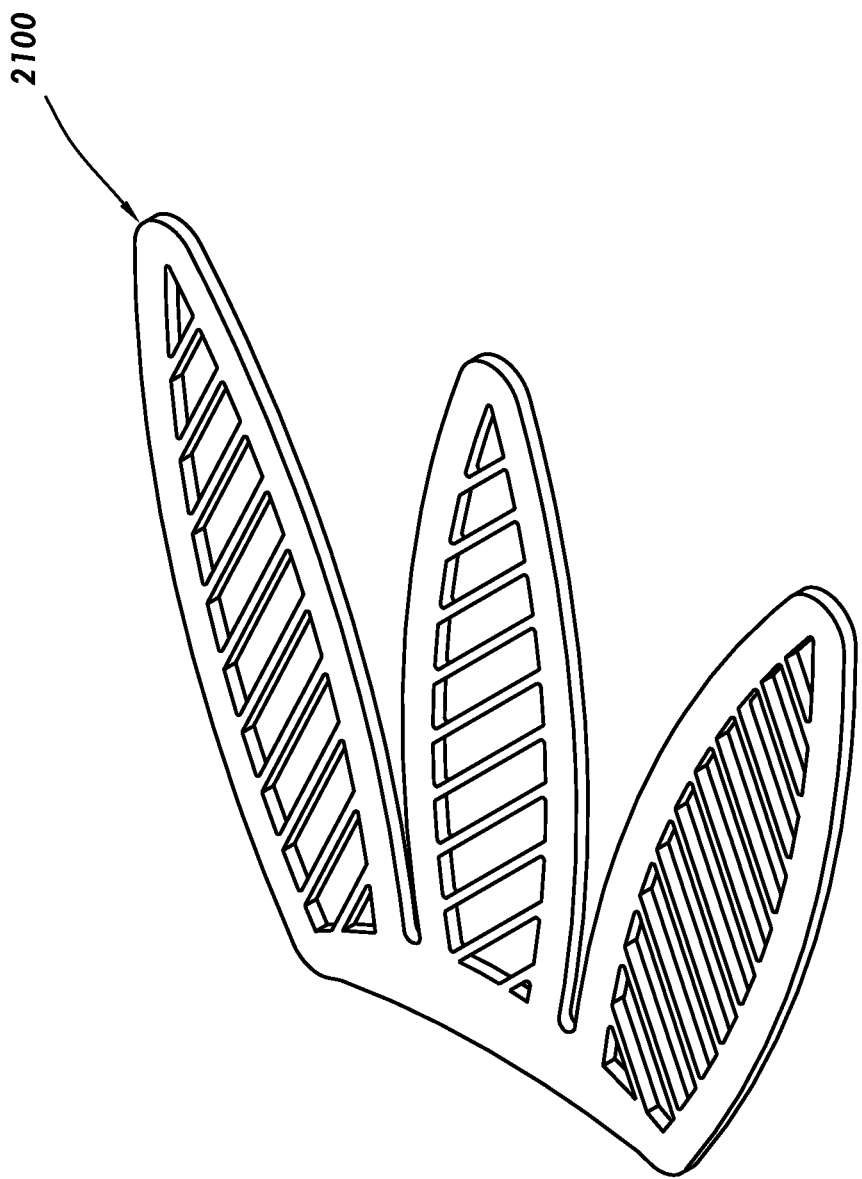
FIG. 22 shows a perspective view of the base tool object in accordance with at least some embodiments.

FIG. 22 shows a perspective view of the base tool object 2100 in accordance with at least some embodiments. FIG. 22 does not include the negative model or the zeroing object and is meant to provide a clearer depiction of features of an example base tool object 2100. For example, the base tool object 2100 may include one or more (e.g., three) tabs that are arranged in a fanned out manner. The tabs may include various slats to reduce an amount of resin material used when printing the base tool object 2100.

Figure 23:
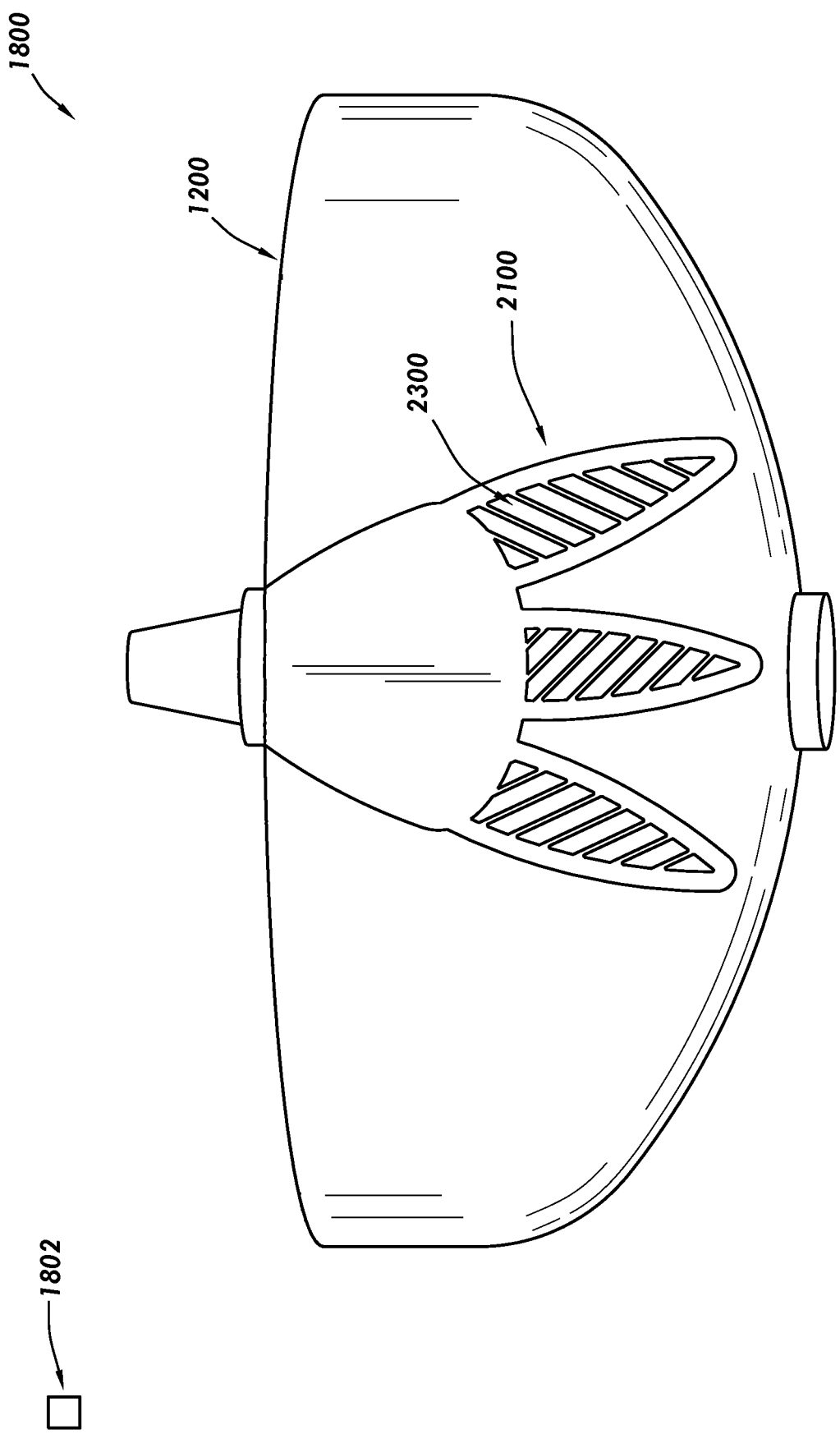
FIG. 23 shows a top view of the base tool object in accordance with at least some embodiments.

FIG. 23 shows a top view of the base tool object 2100 in accordance with at least some embodiments. The base tool object 2100 is merged with the negative model 1200. As depicted, an edge of the front portion abuts an edge of the lip of the negative model 1200. A base of the base tool object 2100 may be flat such that it is parallel with a flat surface of the 3D printer. The 3D coordinate space 1800 may include the zeroing object 1802 disposed at the origin point, as previously discussed. As depicted, a rear portion of the base tool object 2100 may include various elongated holes 2300 where resin is not used to print the base tool object 2100. In some embodiments, the negative model 1200 merged with the base tool object 2100 may be a final negative model that is saved as a .STL file and used to print the negative mold.

Returning to FIG. 16, at block 1616, the processing device may place a bracing tool object 2400 by coupling the bracing tool object 2400 to the stem tool object 604. In some embodiments, placing the bracing tool object 2400 may also include coupling the bracing tool object 2400 to the base tool object 2100. The bracing tool object 2400 may refer to a 3D object model that has a dimension and/or a depth. The bracing tool object 2400 may be coupled exclusively to the stem tool object 604 and the base tool object 2100. In other words, the bracing tool object 2400 may not contact any other portion of the negative model besides the stem tool object 604 and the base tool object 2400.

Figure 24:
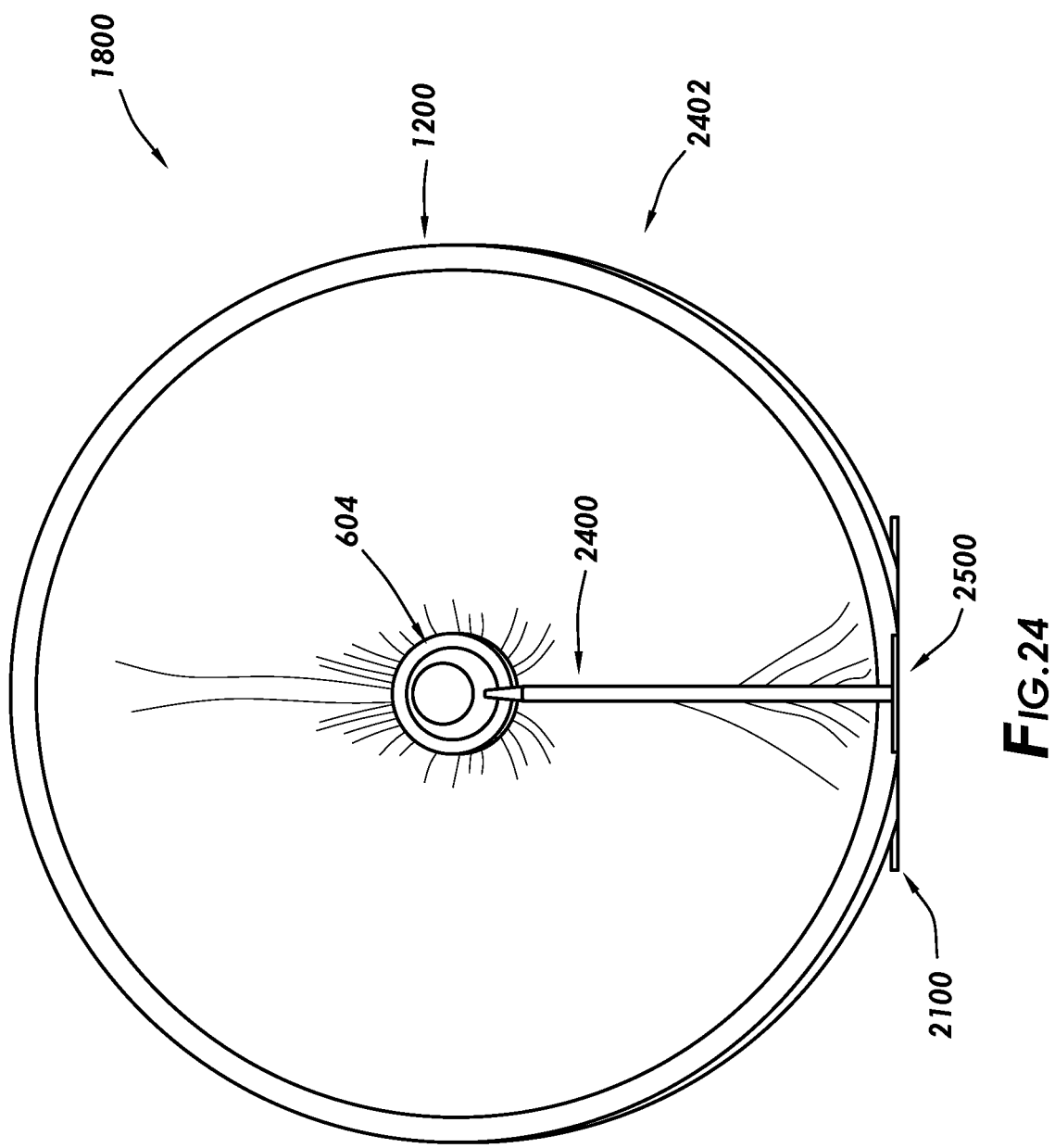
FIG. 24 shows a side view of a bracing tool object and base tool object included with the negative model in accordance with at least some embodiments.

FIG. 24 shows a side view of the bracing tool object 2400 and base tool object 2100 included with the negative model 1200 to create a final negative model 2402 in the 3D coordinate space in accordance with at least some embodiments. In some embodiments, the bracing tool object 2400 may be merged with the stem tool object 604 and the base tool object 2100. The base tool object 2100 may be or may have already been merged with the side of the negative model 1200. The bracing tool object 2400 may be configured to provide structural support for the stem tool object 604 during 3D printing of the final negative model 2402. In some embodiments, as depicted, the bracing tool object 2400 has a length approximately the same as a radius of the circular opening of the negative model 1200. Although one bracing tool object 2400 is depicted, in some embodiments more than one bracing tool object may be merged with the negative model.

In some embodiments, instead of using a bracing tool object, various shaped patterns may be included on an inner lining of the surface of the negative model 1200. The shaped patterns may be configured to provide structural support when printing; however, generating the shaped patterns and including them on the inner lining may consume computing resources by electronically modifying the surface of the inner lining of the negative model. Such modifications may cause the size of the file including the objects, tools, models, etc. to increase and may be less computationally efficient than using a bracing tool object (which does not require modifying the inner lining surface of the negative model). Accordingly, the bracing tool object 2400 may provide a technical solution to a technical problem of providing support to the stem tool object 604.

Once the negative mold is printed, the bracing tool object 2400 may be physically removed (e.g., cut out) from the negative mold, such that the negative mold includes one or more representations of anatomical structures (e.g., an anus, an external genitalia, etc.) and/or the base tool object 2100. Further, the negative model may include a unique identification number along the exterior shape.

FIG. 25 shows a top view of the base tool object 2100 including a tab 2500 for the bracing tool object 2400 of the final negative model 2402 in the 3D coordinate space 1800 in accordance with at least some embodiments. As depicted, the front portion 2104 of the base tool object includes the tab 2500 which extends beyond the edge of the negative model 1200. The tab 2500 may be any suitable shape that enables coupling to an end of the bracing tool object 2400.

Figure 26A:
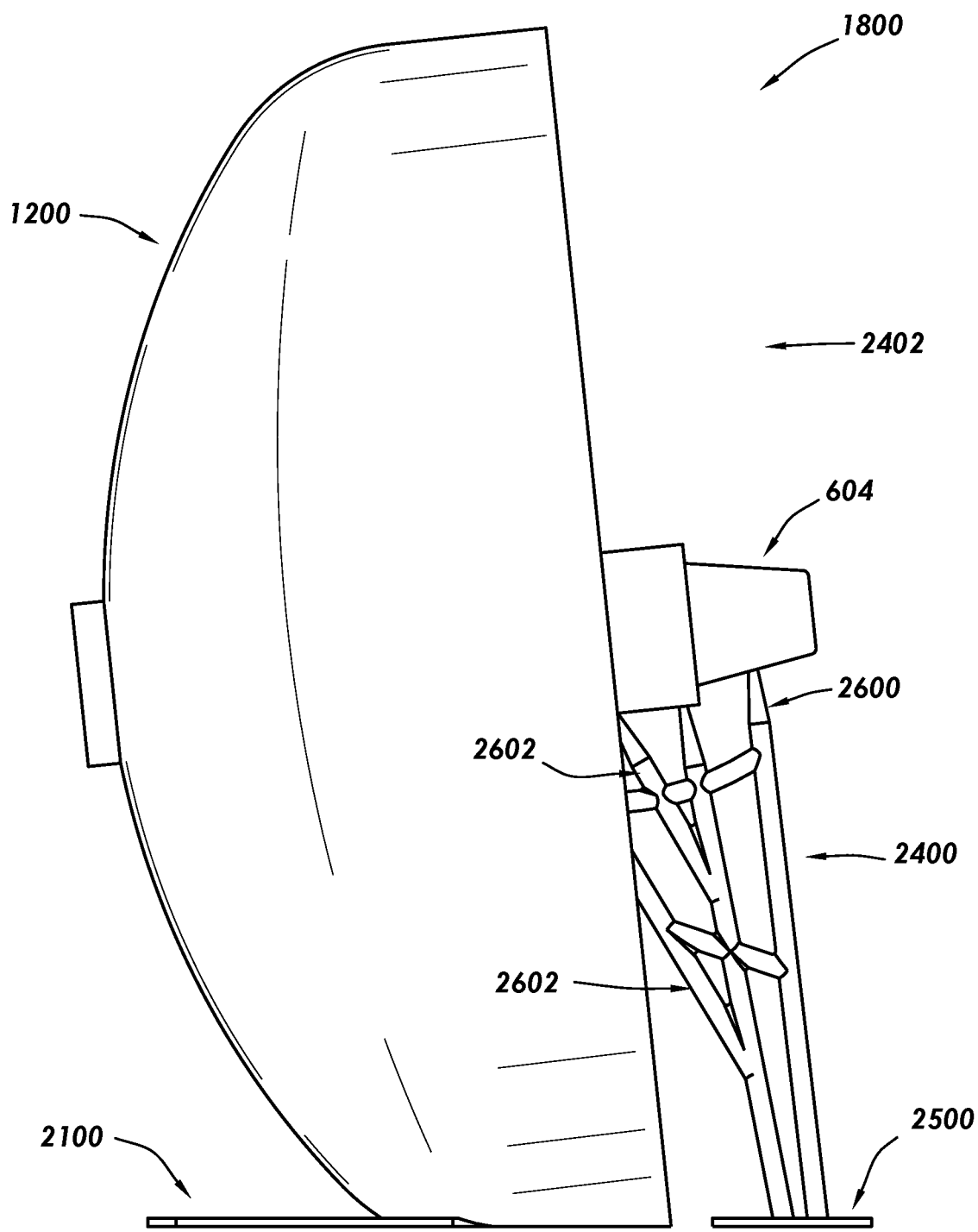
FIG. 26A shows another side view of a bracing tool object and base tool object included with the negative model in accordance with at least some embodiments.
Figure 26B:
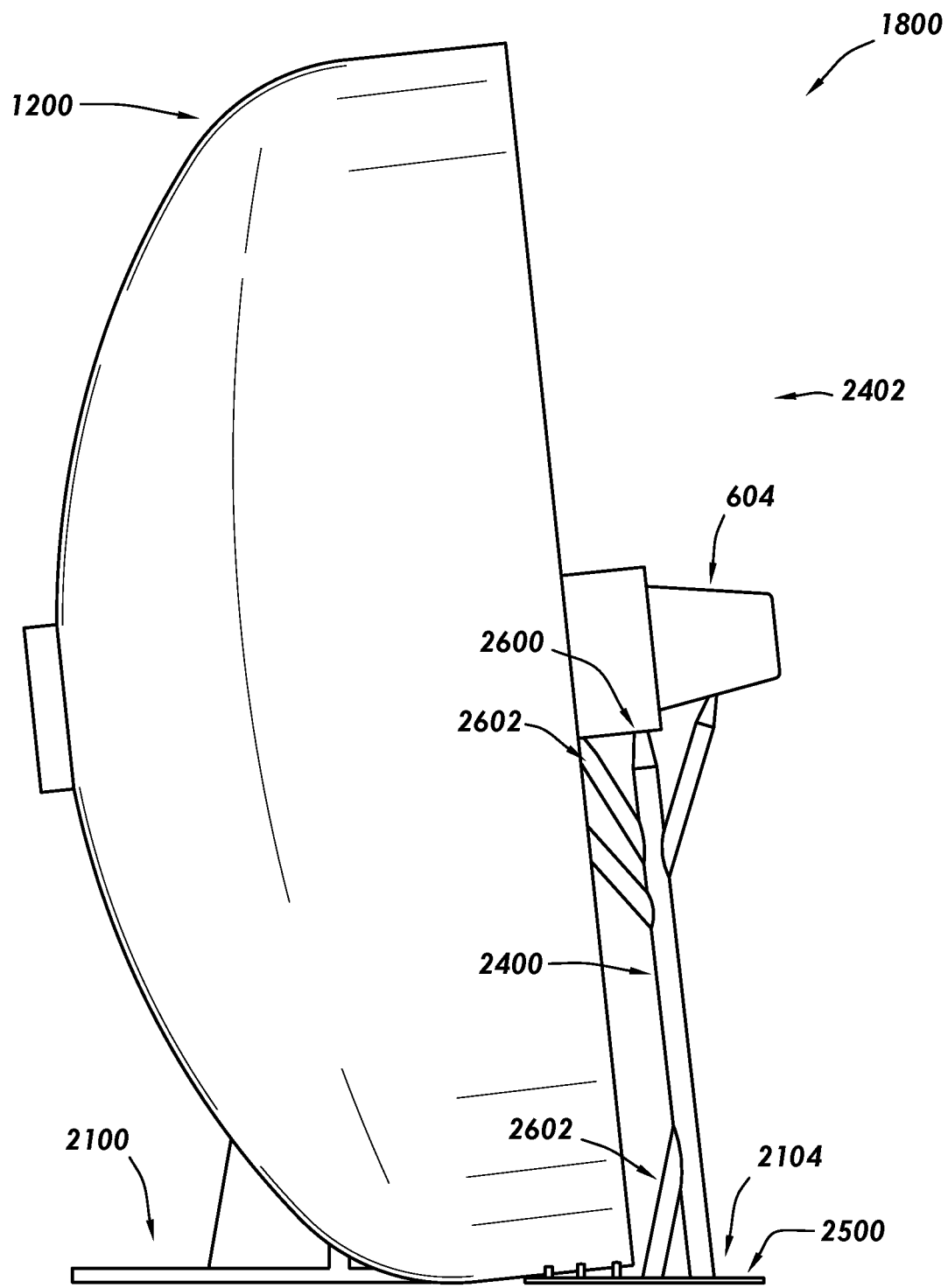
FIG. 26B shows another side view of a bracing tool object and base tool object included with the negative model in accordance with at least some embodiments.

FIG. 26A shows another side view of the bracing tool object 2400 and base tool object 2100 included with the final negative model 2402 in accordance with at least some embodiments. As depicted, the bracing tool object 2400 is merged and coupled with a portion of the stem tool object 604 and the tab 2500 of the base tool object 2100. The bracing tool object 2400 may include one or more main post objects 2600 that provide primary physical support and a connection between the stem tool object 604 and the base tool object 2100 including tab 2500. The bracing tool object 2400 may include one or more branch objects 2602 that protrude from a side of one or more of the main post objects 2600 and connect to the stem tool object 604 or the base tool object 2100. Any suitable number of branch objects 2602 may be used to support the stem tool object 604 during printing. For example, in some embodiments, the number of branch objects 2602, size of branch objects 2602, and/or locations of branch objects 2602 may be dependent on the size, length, depth, etc. of the stem tool object 604 (e.g., a larger stem tool object 604 may require more branch objects 2602 than a smaller stem tool object 604). As depicted, the bracing tool object 2400 includes the two main post objects 2600 and two branch objects 2602 connected to the tab 2500 of the base tool object 2100 and connected to the stem tool object 604. The tips of the main post objects 2600 and the branch objects 2602 connected to the stem tool object 604 may have conical pointed shapes to reduce the surface area of the stem tool object 604 with which the branch objects 2602 are connected. Another example bracing tool object 2400 is depicted in FIG. 26B.

Figure 27:
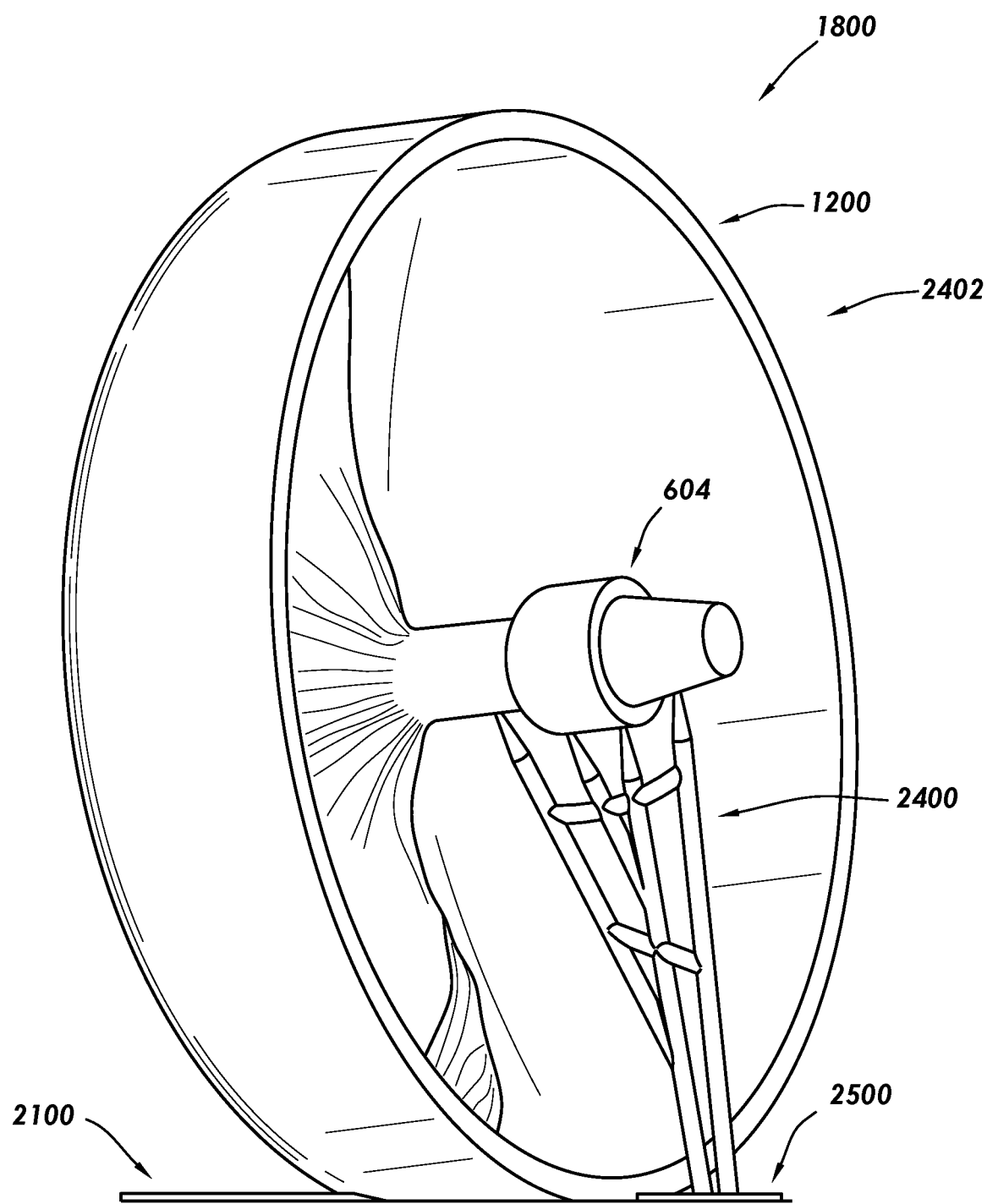
FIG. 27 shows a perspective view of a bracing tool object and base tool object included with the negative model in accordance with at least some embodiments.
Figure 28:
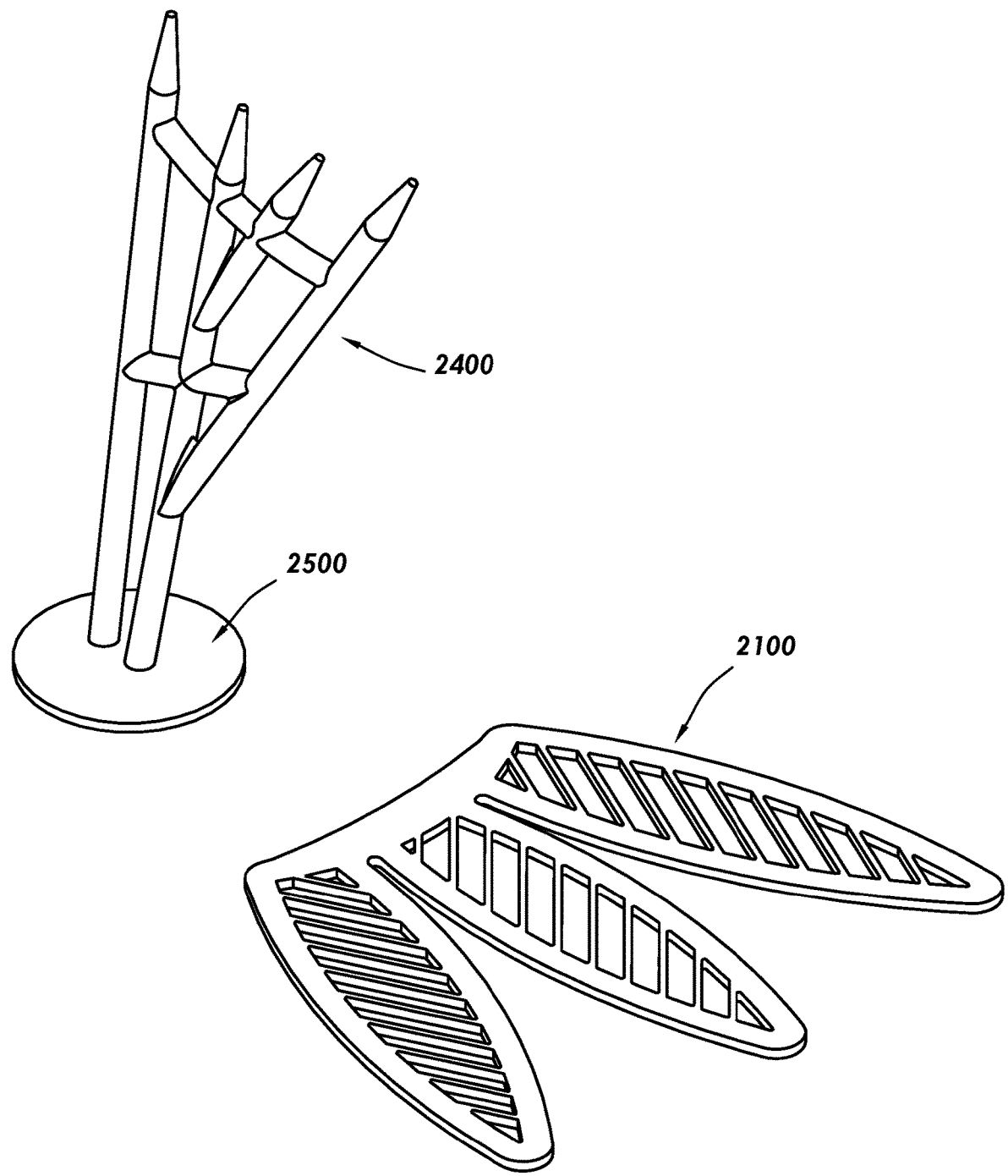
FIG. 28 shows a perspective view of a bracing tool object and base tool object in accordance with at least some embodiments.

In some embodiments, when the stem tool object 604 of the negative model 1200 includes inherent support 2003, as depicted in FIG. 20, then the base tool object 2100 may not include the bracing tool object 2400 (as shown in FIG. 21). In such a scenario, the base tool object 2100 depicted in FIG. 22 may be selected to be merged with the negative model 1200. In some embodiments, when the stem tool object 604 does not include inherent support, as depicted in FIG. 27, then the base tool object 2100 (as shown in FIG. 28) including the bracing tool object 2400 may be selected and merged with the negative model 1200. In either scenario, the base tool object 2100 with or without the bracing tool object 2400 may be located at a particular coordinate location in the 3D coordinate space 1800 such that it merges with the negative model 1200 accurately when the file including the base tool object 2100 and the file including the negative model 1200 are combined.

FIG. 27 shows a perspective view of the bracing tool object 2400 and base tool object 2100 included with the final negative model 2402 in accordance with at least some embodiments. The perspective view in FIG. 27 more clearly depicts the connection points of the bracing tool object 2400 to the stem tool object 604.

FIG. 28 shows a perspective view of the bracing tool object 2400 and base tool object 2100 in accordance with at least some embodiments. As depicted, the front portion 2104 of the base tool object 2100 includes (i) the prongs and (ii) the tab 2500 including a connected end of the bracing tool object 2400. In some embodiments, when the negative mold is printed, the bracing tool object 2400 may be physically removed while the base tool object 2100 remains coupled to the negative mold. In some embodiments, both the bracing tool object 2400 and the base tool object 2100 may be removed from the negative mold. In some embodiments, the bracing tool object 2400 and the base tool object 2100 may remain coupled to the negative mold.

Returning to FIG. 16, the next step (block 1618) in the example method is printing the final negative model 2402 to create a negative mold to be used in the casting process. In at least some example embodiments, the final negative model 2402 is data contained in an electronic file, such as in the .STL format. The data file may be provided to any suitable 3D printer or 3D printer technology, such as fused deposition modeling (FDM), stereolithography (SLA), digital light processing (DLP), selective laser sintering (SLS), selecting laser melting (SLM), laminated object manufacturing (LOM), or digital beam melting (EBM). For example, the 3D printer may be a FORMLABS 3D printer available from FORMLABS, Inc. In yet still other example embodiments, the final negative model 2402 may be printed on a 3D SYSTEMS printer available from 3D SYSTEMS Inc. (e.g., the 3D SYSTEMS model FIG. 4). That is, by way of the 3D printer 112 (FIG. 1), the final negative model 2402 becomes a physical thing, termed herein a negative mold. Further, at block 1620, the method may include casting the replica of the anatomical structure using the negative mold (block 1620). The method may end at block 1622.

In some embodiments, the processing device (e.g., processor 1502) may obtain information pertaining to one or more social media platforms with which the subject is registered. The information may indicate a number of followers associated with the subject's social media account, a number of subscribers associated with the subject's social media account, a number of friends associated with the subject's social media account, or some combination thereof. For example, the processing device may access a database associated with the social media platforms to query information pertaining to an account of the subject. In some embodiments, the processing device may communicatively couple to an application programming interface hosted by the social media platforms that provides functionality for querying information pertaining to accounts of users of the social media platforms. In some embodiments, the processing device may use one or more web crawling applications to access the social media platforms, including webpages or user interfaces associated with the subject's social media accounts, and perform screen scraping techniques (e.g., object character recognition, optical character recognition, natural language processing, etc.) to obtain information pertaining to the subject's social media accounts.

In some embodiments, the processing device may determine, based on the information, a volume demand for the anatomical structure of the subject. In some embodiments, the information (e.g., including the number of followers associated with the subject, number of subscribers associated with the subject, number of friends associated with the subject, etc.) may indicate the subject is a "social influencer" or popular, meaning the subject has a large number of users on the social media account that are notified of social media posts and/or the subject's activity on the social media platform. In some embodiments, printing the negative final model 2402 may include printing a number of negative molds determined based on the volume demand. If the subject is a social influencer, the number of negative molds may be higher than if the subject is determined to not be a social influencer.

In some embodiments, the processing device may determine, based on the information, a volume demand for the anatomical structure of the subject. In some embodiments, the information (e.g., including the number of followers associated with the subject, number of subscribers associated with the subject, number of friends associated with the subject, etc.) may indicate the subject is a "social influencer" or popular, meaning the subject has a large number of users on the social media account that are notified of social media posts and/or the subject's activity on the social media platform. In some embodiments, the processing device may select, based on the information, a person, from a group of persons, to which to assign a portion of modifying the negative model. The person may be a highly skilled 3D model artist that modifies the negative model associated with the anatomical structure of the subject who is determined to be a social influencer.

In some embodiments, the processing device may determine, based on the information, a volume demand for the anatomical structure of the subject. In some embodiments, the information (e.g., including the number of followers associated with the subject, number of subscribers associated with the subject, number of friends associated with the subject, etc.) may indicate the subject is a "social influencer" or popular, meaning the subject has a large number of users on the social media account that are notified of social media posts and/or the subject's activity on the social media platform. In some embodiments, the processing device may determine, based at least on the information, a number of initial replicas to manufacture. For example, if the information indicates the subject has a very little following of users on social media platforms, then the number of initial replicas may be very small. On the other hand, if the information indicates the subject has a very large following of users on social media platforms, then the number of initial replicas may be very large.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

Clauses:

Clause 1. A method of creating a replica of an anatomical structure, comprising:
 accepting, by a first computer system, a plurality of pictures of the anatomical structure of a subject, each picture of the plurality of pictures from a distinct viewing angle relative to the anatomical structure;
 creating, by the first computer system, an object file that contains an initial model of an outside surface of the anatomical structure;
 cutting, by the first computer system, the initial model to a predetermined exterior shape circumscribing the anatomical structure, the cutting creates a positive model of the anatomical structure within the predetermined exterior shape;
 creating, by the first computer system, a negative model of the anatomical structure from the positive model;
 placing, by the first computer system, a stem tool object on an outside surface of the negative model in relationship to an orifice of the anatomical structure;
 placing, by the first computer system, a zeroing object and angling object to align the negative model to a predetermined angle;
 placing, by the first computer system, a base tool object by coupling the base tool object to the outside surface of the aligned negative model to create a final negative model; and
 printing, by way of a three-dimensional printer, the final negative model to create a negative mold; and
 casting the replica of the anatomical structure using the negative mold.

Clause 2. The method of any clause herein, further comprising, prior to printing the final negative model, placing a bracing tool object by coupling the bracing tool object to the stem tool object to create a final negative model.

Clause 3. The method of any clause herein, further comprising coupling the bracing tool object to the base tool object, wherein the bracing tool object is coupled exclusively to the stem tool object and the base tool object.

Clause 4. The method of any clause herein, wherein the base tool object is configured to support the negative mold at the predetermined angle.

Clause 5. The method of any clause herein, wherein placing the zeroing object and the angling object further comprises:
 placing the zeroing object at an origin point in a three-dimensional (3D) coordinate space comprising the negative model;
 placing, within the 3D coordinate space, the angling object relative to the zeroing object such that a base of the angling object is in line with a base of the zeroing object; and placing a lip of the outside surface of the negative model flush against an angled wall portion of the angling object, such that the negative model is angled to the predetermined angle specified by the angled wall portion.

Clause 6. The method of any clause herein, further comprising cutting the negative model to remove the angling object from the 3D coordinate space while leaving the zeroing object at the origin point in the 3D coordinate space.

Clause 7. The method of any clause herein, further comprising:
cutting, by the first computer system, the negative model to remove the angling object from the negative model.

Clause 8. The method of any clause herein, further comprising:
obtaining information pertaining to one or more social media platforms with which the subject is registered, wherein the information indicates a number of followers associated with the subject, a number of subscribers associated with the subject, a number of friends associated with the subject, or some combination thereof; and
determining, based at least on the information, a volume demand for the anatomical structure of the subject; and
wherein printing the final negative model further comprises printing a number of negative molds determined based on the volume demand.

Clause 9. The method of any clause herein, further comprising:
obtaining information pertaining to one or more social media platforms with which the subject is registered, wherein the information indicates a number of followers associated with the subject, a number of subscribers associated with the subject, a number of friends associated with the subject, or some combination thereof; and
selecting, based at least on the information, a person, from a group of persons, to which to assign a portion of modifying the negative model.

Clause 10. The method of any clause herein, further comprising:
obtaining information pertaining to one or more social media platforms with which the subject is registered, wherein the information indicates a number of followers associated with the subject, a number of subscribers associated with the subject, a number of friends associated with the subject, or some combination thereof; and
determining, based at least on the information, a number of initial replicas to manufacture.

Clause 11. The method of any clause herein, wherein the base tool object is configured to maintain a round shape of the negative mold.

Clause 12. The method of any clause herein, further comprising, prior to creating the negative model, adding the unique identification number along the predetermined exterior shape of the positive model.

Clause 13. The method of any clause herein, wherein the anatomical structure is at least one selected from the group comprising: a mouth, external genitalia, and an anus.

Clause 14. The method of any clause herein, wherein the first computer system comprises a plurality of distinct computer systems.

Clause 15. A system for creating a negative model of an anatomical structure, comprising:
a processor;
a memory coupled to the processor;
the memory storing a program that, when executed by the processor, causes the processor to:
accept a plurality of pictures of the anatomical structure of a subject, each picture of the plurality of pictures from a distinct viewing angle relative to the anatomical structure;
create an object file that contains an initial model of an outside surface of the anatomical structure;
cut the initial model to a predetermined exterior shape circumscribing the anatomical structure, the cutting creates a positive model of the anatomical structure within the predetermined exterior shape;
create a negative model of the anatomical structure from the positive model;
place a stem tool object on an outside surface of the negative model in relationship to an orifice of the anatomical structure;
place a zeroing object and angling object to align the negative model to a predetermined angle;
place a base tool object by coupling the base tool object to the outside surface of the aligned negative model; and
print the final negative model to create a negative mold.

Clause 16. The system of any clause herein, wherein the program causes the processor to, prior to printing the final negative model, place a bracing tool object by coupling the bracing tool object to the stem tool object to create a final negative model.

Clause 17. The system of any clause herein, wherein the program causes the processor to couple the bracing tool object to the base tool object, wherein the bracing tool object is coupled exclusively to the stem tool object and the base tool object.

Clause 18. The system of any clause herein, wherein the base tool object is configured to support the negative mold at the predetermined angle.

Clause 19. The system of any clause herein, wherein placing the zeroing object and the angling object further comprises:
placing the zeroing object at an origin point in a three-dimensional (3D) coordinate space comprising the negative model;
placing, within the 3D coordinate space, the angling object relative to the zeroing object such that a base of the angling object is in line with a base of the zeroing object; and
placing a lip of the outside surface of the negative model flush against an angled wall portion of the angling object, such that the negative model is angled to the predetermined angle specified by the angled wall portion.

Clause 20. A tangible, non-transitory computer-readable medium storing instructions that, when executed, cause a processing device to:
accept a plurality of pictures of the anatomical structure of a subject, each picture of the plurality of pictures from a distinct viewing angle relative to the anatomical structure;
create an object file that contains an initial model of an outside surface of the anatomical structure;
cut the initial model to a predetermined exterior shape circumscribing the anatomical structure, the cutting creates a positive model of the anatomical structure within the predetermined exterior shape;
create a negative model of the anatomical structure from the positive model;

place a stem tool object on an outside surface of the negative model in relationship to an orifice of the anatomical structure;

place a zeroing object and angling object to align the negative model to a predetermined angle;

place a base tool object by coupling the base tool object to the outside surface of the aligned negative model to create a final negative model; and print the final negative model to create a negative mold.

What is claimed is:

1. A method of creating a replica of an anatomical structure, comprising:

accepting, by a first computer system, a plurality of pictures of the anatomical structure of a subject, each picture of the plurality of pictures from a distinct viewing angle relative to the anatomical structure;

creating, by the first computer system, an object file that contains an initial model of an outside surface of the anatomical structure;

cutting, by the first computer system, the initial model to a predetermined exterior shape circumscribing the anatomical structure, the cutting creates a positive model of the anatomical structure within the predetermined exterior shape;

creating, by the first computer system, a negative model of the anatomical structure from the positive model;

placing, by the first computer system, a stem tool object on an outside surface of the negative model in relationship to an orifice of the anatomical structure;

placing, by the first computer system, a zeroing object and angling object to align the negative model to a predetermined angle;

placing, by the first computer system, a base tool object by coupling the base tool object to the outside surface of the aligned negative model to create a final negative model; and printing, by way of a three-dimensional printer, the final negative model to create a negative mold; and casting the replica of the anatomical structure using the negative mold.

2. The method of claim 1, further comprising, prior to printing the final negative model, placing a bracing tool object by coupling the bracing tool object to the stem tool object to create a final negative model.

3. The method of claim 2, further comprising coupling the bracing tool object to the base tool object, wherein the bracing tool object is coupled exclusively to the stem tool object and the base tool object.

4. The method of claim 2, wherein the base tool object is configured to support the negative mold at the predetermined angle.

5. The method of claim 1, wherein placing the zeroing object and the angling object further comprises:

placing the zeroing object at an origin point in a three-dimensional (3D) coordinate space comprising the negative model;

placing, within the 3D coordinate space, the angling object relative to the zeroing object such that a base of the angling object is in line with a base of the zeroing object; and placing a lip of the outside surface of the negative model flush against an angled wall portion of the angling object, such that the negative model is angled to the predetermined angle specified by the angled wall portion.

6. The method of claim 5, further comprising cutting the negative model to remove the angling object from the 3D coordinate space while leaving the zeroing object at the origin point in the 3D coordinate space.

7. The method of claim 1, further comprising:

cutting, by the first computer system, the negative model to remove the angling object from the negative model.

8. The method of claim 1, further comprising:

obtaining information pertaining to one or more social media platforms with which the subject is registered, wherein the information indicates a number of followers associated with the subject, a number of subscribers associated with the subject, a number of friends associated with the subject, or some combination thereof; and determining, based at least on the information, a volume demand for the anatomical structure of the subject; and wherein printing the final negative model further comprises printing a number of negative molds determined based on the volume demand.

9. The method of claim 1, further comprising:

obtaining information pertaining to one or more social media platforms with which the subject is registered, wherein the information indicates a number of followers associated with the subject, a number of subscribers associated with the subject, a number of friends associated with the subject, or some combination thereof; and selecting, based at least on the information, a person, from a group of persons, to which to assign a portion of modifying the negative model.

10. The method of claim 1, further comprising:

obtaining information pertaining to one or more social media platforms with which the subject is registered, wherein the information indicates a number of followers associated with the subject, a number of subscribers associated with the subject, a number of friends associated with the subject, or some combination thereof; and determining, based at least on the information, a number of initial replicas to manufacture.

11. The method of claim 1, wherein the base tool object is configured to maintain a round shape of the negative mold.

12. The method of claim 1, further comprising, prior to creating the negative model, adding a unique identification number along the predetermined exterior shape of the positive model.

13. The method of claim 1, wherein the anatomical structure comprises at least one selected from a group including: a mouth, external genitalia, and an anus.

14. The method of claim 1, wherein the first computer system comprises a plurality of distinct computer systems.

15. A system for creating a negative model of an anatomical structure, comprising:

a processor;

a memory coupled to the processor;

the memory storing a program that, when executed by the processor, causes the processor to:

accept a plurality of pictures of the anatomical structure of a subject, each picture of the plurality of pictures from a distinct viewing angle relative to the anatomical structure;

create an object file that contains an initial model of an outside surface of the anatomical structure;

cut the initial model to a predetermined exterior shape circumscribing the anatomical structure, the cutting creates a positive model of the anatomical structure within the predetermined exterior shape;

create a negative model of the anatomical structure from the positive model;

place a stem tool object on an outside surface of the negative model in relationship to an orifice of the anatomical structure;

place a zeroing object and angling object to align the negative model to a predetermined angle;

place a base tool object by coupling the base tool object to the outside surface of the aligned negative model; and print the final negative model to create a negative mold.

16. The system of claim 15, wherein the program causes the processor to, prior to printing the final negative model, place a bracing tool object by coupling the bracing tool object to the stem tool object to create a final negative model.

17. The system of claim 16, wherein the program causes the processor to couple the bracing tool object to the base tool object, wherein the bracing tool object is coupled exclusively to the stem tool object and the base tool object.

18. The system of claim 16, wherein the base tool object is configured to support the negative mold at the predetermined angle.

19. The system of claim 15, wherein placing the zeroing object and the angling object further comprises:

placing the zeroing object at an origin point in a three-dimensional (3D) coordinate space comprising the negative model;

placing, within the 3D coordinate space, the angling object relative to the zeroing object such that a base of the angling object is in line with a base of the zeroing object; and placing a lip of the outside surface of the negative model flush against an angled wall portion of the angling object, such that the negative model is angled to the predetermined angle specified by the angled wall portion.

20. A tangible, non-transitory computer-readable medium storing instructions that, when executed, cause a processing device to:

accept a plurality of pictures of an anatomical structure of a subject, each picture of the plurality of pictures from a distinct viewing angle relative to the anatomical structure;

create an object file that contains an initial model of an outside surface of the anatomical structure;

cut the initial model to a predetermined exterior shape circumscribing the anatomical structure, the cutting creates a positive model of the anatomical structure within the predetermined exterior shape;

create a negative model of the anatomical structure from the positive model;

place a stem tool object on an outside surface of the negative model in relationship to an orifice of the anatomical structure;

place a zeroing object and angling object to align the negative model to a predetermined angle;

place a base tool object by coupling the base tool object to the outside surface of the aligned negative model to create a final negative model; and print the final negative model to create a negative mold.

* * * * *